United States Patent
Avanes et al.

(10) Patent No.: US 11,574,072 B2
(45) Date of Patent: *Feb. 7, 2023

(54) DYNAMIC SHARED DATA OBJECT MASKING

(71) Applicant: Snowflake Inc., Bozeman, MT (US)

(72) Inventors: Artin Avanes, Palo Alto, CA (US); Khalid Zaman Bijon, Santa Cruz, CA (US); Damien Carru, New York, NY (US); Thierry Cruanes, San Mateo, CA (US); Vikas Jain, Fremont, CA (US); Zheng Mi, Palo Alto, CA (US); Subramanian Muralidhar, Mercer Island, WA (US)

(73) Assignee: Snowflake Inc., Bozeman, MT (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/334,315

(22) Filed: May 28, 2021

(65) Prior Publication Data

US 2021/0286894 A1 Sep. 16, 2021

Related U.S. Application Data

(63) Continuation of application No. 17/086,269, filed on Oct. 30, 2020, now Pat. No. 11,055,430, which is a
(Continued)

(51) Int. Cl.
*G06F 21/62* (2013.01)
*G06F 16/25* (2019.01)
(Continued)

(52) U.S. Cl.
CPC ........ *G06F 21/6227* (2013.01); *G06F 16/221* (2019.01); *G06F 16/2282* (2019.01);
(Continued)

(58) Field of Classification Search
None
See application file for complete search history.

(56) References Cited

U.S. PATENT DOCUMENTS 8,306,932 B2 * 11/2012 Saxena ................ G06N 3/0427
706/42
8,930,410 B2 * 1/2015 Alton .................. G06F 16/2455
707/802
(Continued)

FOREIGN PATENT DOCUMENTS

DE 202020005715 U1 3/2022

OTHER PUBLICATIONS

"U.S. Appl. No. 16/698,142, 312 Amendment filed Oct. 29, 2020".
(Continued)

*Primary Examiner* — Fatoumata Traore
(74) *Attorney, Agent, or Firm* — Schwegman Lundberg & Woessner, P.A.

(57) ABSTRACT

A shared database platform implements dynamic masking on data shared between users where specific data is masked, transformed, or otherwise modified based on preconfigured functions that are associated with user roles. The shared database platform can implement the masking at runtime dynamically in response to users requesting access to a database object that is associated with one or more masking policies.

27 Claims, 19 Drawing Sheets

Related U.S. Application Data continuation of application No. 16/698,142, filed on Nov. 27, 2019, now Pat. No. 10,867,063.

(51) Int. Cl.
  G06F 16/248 (2019.01)
  G06F 16/22 (2019.01)
  G06F 16/27 (2019.01)

(52) U.S. Cl.
  CPC .......... G06F 16/248 (2019.01); G06F 16/252 (2019.01); G06F 16/27 (2019.01)

(56) References Cited

U.S. PATENT DOCUMENTS

| | | | |
|---|---|---|---|
| 10,867,063 B1 | 12/2020 | Avanes et al. | |
| 2002/0095405 A1* | 7/2002 | Fujiwara | G06F 21/6227 |
| 2003/0014394 A1* | 1/2003 | Fujiwara | G06F 16/284 |
| 2009/0024570 A1* | 1/2009 | Yoaz | G06F 16/24547 |
| 2009/0049511 A1 | 2/2009 | Manickam et al. | |
| 2009/0100527 A1* | 4/2009 | Booth | G06F 21/6254 726/27 |
| 2011/0270896 A1* | 11/2011 | Stegelmann | G06F 16/2291 707/803 |
| 2014/0075571 A1* | 3/2014 | Jackson | G06F 21/6227 726/28 |
| 2015/0113659 A1* | 4/2015 | D'Costa | G06F 21/6254 726/26 |
| 2016/0269417 A1 | 9/2016 | Saxena et al. | |
| 2018/0025058 A1* | 1/2018 | Kim | G06F 16/24561 707/774 |
| 2021/0157948 A1 | 5/2021 | Avanes et al. | |

OTHER PUBLICATIONS

"U.S. Appl. No. 16/698,142, Final Office Action dated May 28, 2020", 15 pgs.

"U.S. Appl. No. 16/698,142, Non-Final Office Action dated Feb. 4, 2020".

"U.S. Appl. No. 16/698,142, Notice of Allowance dated Sep. 2, 2020", 9 pgs.

"U.S. Appl. No. 16/698,142, PTO Response to Rule 312 Communication dated Nov. 10, 2020", 3 pgs.

"U.S. Appl. No. 16/698,142, Response filed May 1, 2020 to Non-Final Office Action dated Feb. 4, 2020", 17 pgs.

"U.S. Appl. No. 16/698,142, Response filed Jul. 28, 2020 to Final Office Action dated May 28, 2020", 20 pgs.

"U.S. Appl. No. 17/086,269, Non-Final Office Action dated Dec. 16, 2020", 18 pgs.

"U.S. Appl. No. 17/086,269, Notice of Allowance dated Mar. 31, 2021", 8 pgs.

"U.S. Appl. No. 17/086,269, Response filed Mar. 12, 2021 to Non-Final Office Action dated Dec. 16, 2020", 16 pgs.

"International Application Serial No. PCT/US2020/044601, International Search Report dated Sep. 10, 2020", 2 pgs.

"International Application Serial No. PCT/US2020/044601, Written Opinion dated Sep. 10, 2020", 5 pgs.

U.S. Appl. No. 16/698,142, U.S. Pat. No. 10,867,063, filed Nov. 27, 2019, Dynamic Shared Data Object Masking.

U.S. Appl. No. 17/086,269, filed Oct. 30, 2020, Dynamic Shared Data Object Masking.

"Korean Application Serial No. 10-2021-7031202, Notice of Preliminary Rejection dated May 17, 2022", (w/ English Translation), 10 pgs.

"International Application Serial No. PCT/US2020/044601, International Preliminary Report on Patentability dated Jun. 9, 2022", 7 pgs.

"Korean Application Serial No. 10-2021-7031202, Response filed Jul. 14, 2022 to Notice of Preliminary Rejection dated May 17, 2022", (w/ English Translation of Claims), 34 pgs.

"Indian Application Serial No. 202147052037, First Examination Report dated Sep. 9, 2022", 6 pgs.

\* cited by examiner

DYNAMIC SHARED DATA OBJECT MASKING

CROSS-REFERENCE TO RELATED APPLICATION

This application is a Continuation of U.S. patent application Ser. No. 17/086,269, filed on Oct. 30, 2020, which is a Continuation of U.S. patent application Ser. No. 16/698,142, filed on Nov. 27, 2019 and issued on Dec. 15, 2020 as U.S. Pat. No. 10,867,063, the contents of which are incorporated by reference herein in their entireties.

TECHNICAL FIELD

The present disclosure generally relates to special-purpose machines that manage databases and improvements to such variants, and to the technologies by which such special-purpose machines become improved compared to other special-purpose machines for transforming data in databases.

BACKGROUND

Data can be uploaded to a database and access to the database data can be managed by a database administrator. More recently cloud database services have risen in popularity due to the ease of which new database instances can be created to store data. While the new cloud database services allow databases to be easily created, the cloud database services create new issues with regard to data privacy. For instance, it can be difficult to create access for specific individuals to specific data within a given database in a way that is both secure and scalable as the amount of data increases.

BRIEF DESCRIPTION OF THE DRAWINGS

Various ones of the appended drawings merely illustrate example embodiments of the present disclosure and should not be considered as limiting its scope.

FIG. 6 shows example database objects, according to some example embodiments.

FIG. 7A-7E show example user interfaces for dynamic masking of shared data, according to some example embodiments.

DETAILED DESCRIPTION

The description that follows includes systems, methods, techniques, instruction sequences, and computing machine program products that embody illustrative embodiments of the disclosure. In the following description, for the purposes of explanation, numerous specific details are set forth in order to provide an understanding of various embodiments of the inventive subject matter. It will be evident, however, to those skilled in the art, that embodiments of the inventive subject matter may be practiced without these specific details. In general, well-known instruction instances, protocols, structures, and techniques are not necessarily shown in detail As discussed, it can be difficult to create access and share data in a secure way that is scalable as the amount of data increases. To this end, a shared database platform can implement dynamic masking on data shared between users where specific data is masked, transformed, or otherwise modified based on preconfigured functions that are associated with user roles. The shared database platform can implement the masking at runtime dynamically in response to users requesting access to a database object that is associated with one or more masking policies.

Figure 1:
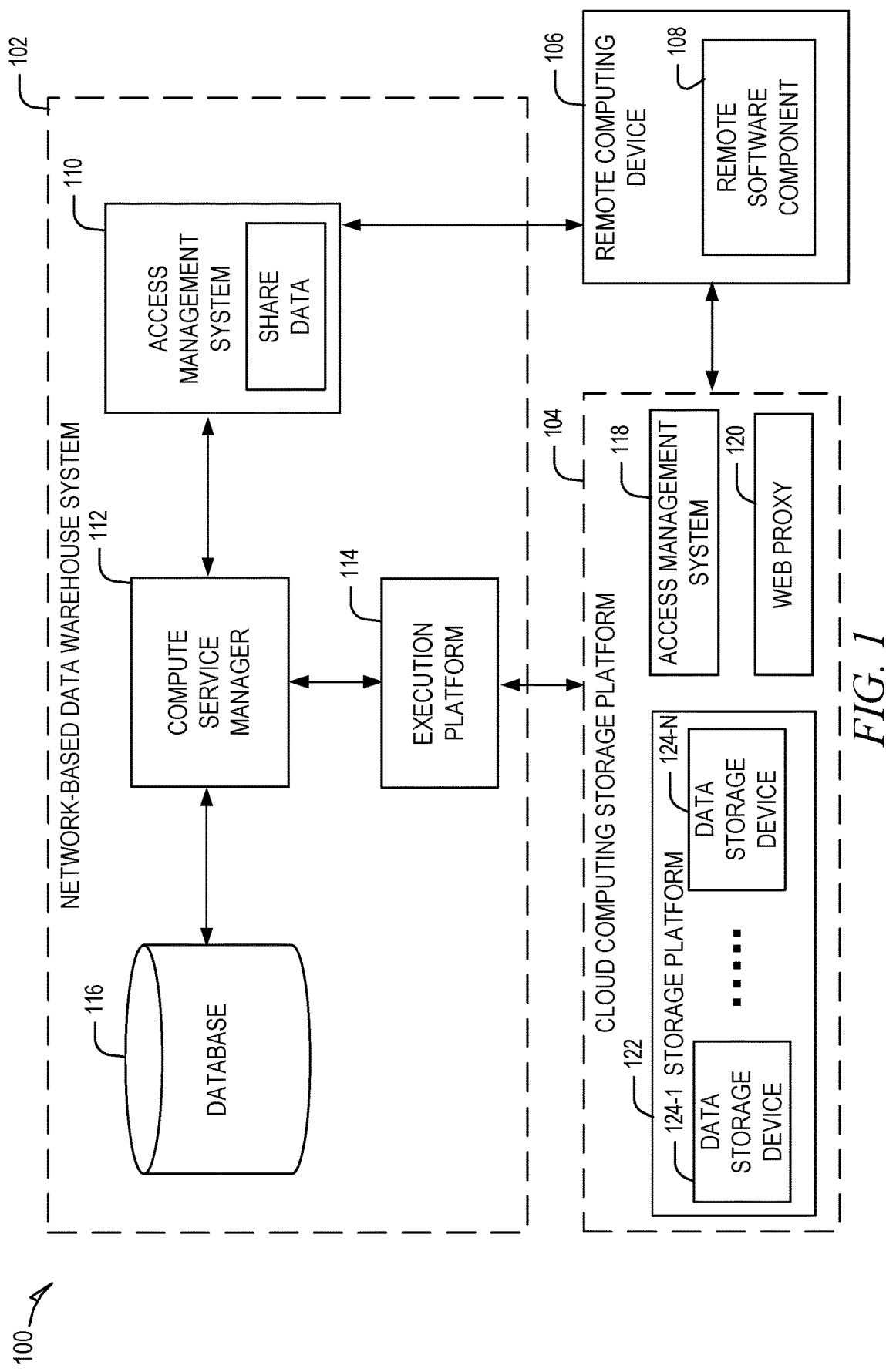
FIG. 1 illustrates an example computing environment in which a network-based data warehouse system can implement dynamic share masking of database objects, according to some example embodiments.

FIG. 1 illustrates an example shared data processing platform 100 in which a network-based data warehouse system 102 implements dynamic masking of shared data objects, in accordance with some embodiments of the present disclosure. To avoid obscuring the inventive subject matter with unnecessary detail, various functional components that are not germane to conveying an understanding of the inventive subject matter have been omitted from the figures. However, a skilled artisan will readily recognize that various additional functional components may be included as part of the shared data processing platform 100 to facilitate additional functionality that is not specifically described herein.

As shown, the shared data processing platform 100 comprises the network-based data warehouse system 102, a cloud computing storage platform 104 (e.g., a storage platform, an AWS® service such as S3, Microsoft Azure®, or Google Cloud Services®), and a remote computing device 106. The network-based data warehouse system 102 is a network-based system used for storing and accessing data (e.g., internally storing data, accessing external remotely located data) in an integrated manner, and reporting and analysis of the integrated data from the one or more disparate sources (e.g., the cloud computing storage platform 104). The cloud computing storage platform 104 comprises a plurality of computing machines and provides on-demand computer system resources such as data storage and computing power to the network-based data warehouse system 102.

The remote computing device 106 (e.g., a user device such as a laptop computer) comprises one or more computing machines (e.g., a user device such as a laptop computer) that execute a remote software component 108 (e.g., browser accessed cloud service) provide additional functionality to users of the network-based data warehouse system 102. The remote software component 108 comprises a set of machine-readable instructions (e.g., code) that, when executed by the remote computing device 106, cause the remote computing device 106 to provide certain functionality. The remote software component 108 may operate on input data and generates result data based on processing, analyzing, or otherwise transforming the input data. As an example, the remote software component 108 can be a data provider or data consumer that processes dynamically masked shared data objects, as discussed in further detail below.

The network-based data warehouse system 102 comprises an access management system 110, a compute service manager 112, an execution platform 114, and a database 116. The access management system 110 enables administrative users to manage access to resources and services provided by the network-based data warehouse system 102. Administrative users can create and manage users, roles, and groups, and use permissions to allow or deny access to resources and services. The access management system 110 can store share data that securely manages shared access to the storage resources of the cloud computing storage platform 104 amongst different users of the network-based data warehouse system 102, as discussed in further detail below.

The compute service manager 112 coordinates and manages operations of the network-based data warehouse system 102. The compute service manager 112 also performs query optimization and compilation as well as managing clusters of computing services that provide compute resources (e.g., virtual warehouses, virtual machines, EC2 clusters). The compute service manager 112 can support any number of client accounts such as end users providing data storage and retrieval requests, system administrators managing the systems and methods described herein, and other components/devices that interact with compute service manager 112.

The compute service manager 112 is also coupled to database 116, which is associated with the entirety of data stored the shared data processing platform 100. The database 116 stores data pertaining to various functions and aspects associated with the network-based data warehouse system 102 and its users. For example, data to be dynamically masked can be stored and accessed on the cloud computing storage platform 104 (e.g., on S3) or stored and accessed on the database 116 that is local to the network-based data warehouse system 102, according to some example embodiments.

In some embodiments, database 116 includes a summary of data stored in remote data storage systems as well as data available from one or more local caches. Additionally, database 116 may include information regarding how data is organized in the remote data storage systems and the local caches. Database 116 allows systems and services to determine whether a piece of data needs to be accessed without loading or accessing the actual data from a storage device. The compute service manager 112 is further coupled to an execution platform 114, which provides multiple computing resources (e.g., virtual warehouses) that execute various data storage and data retrieval tasks, as discussed in greater detail below.

Execution platform 114 is coupled to multiple data storage devices 124-1 to 124-*n* that are part of a cloud computing storage platform 104. In some embodiments, data storage devices 124-1 to 124-*n* are cloud-based storage devices located in one or more geographic locations. For example, data storage devices 124-1 to 124-*n* may be part of a public cloud infrastructure or a private cloud infrastructure. Data storage devices 124-1 to 124-*n* may be hard disk drives (HDDs), solid state drives (SSDs), storage clusters, Amazon S3 storage systems or any other data storage technology. Additionally, cloud computing storage platform 104 may include distributed file systems (such as Hadoop Distributed File Systems (HDFS)), object storage systems, and the like.

The execution platform 114 comprises a plurality of compute nodes (e.g., virtual warehouses). A set of processes on a compute node executes a query plan compiled by the compute service manager 112. The set of processes can include: a first process to execute the query plan; a second process to monitor and delete micro-partition files using a least recently used (LRU) policy, and implement an out of memory (OOM) error mitigation process; a third process that extracts health information from process logs and status information to send back to the compute service manager 112; a fourth process to establish communication with the compute service manager 112 after a system boot; and a fifth process to handle all communication with a compute cluster for a given job provided by the compute service manager 112 and to communicate information back to the compute service manager 112 and other compute nodes of the execution platform 114.

The cloud computing storage platform 104 also comprises an access management system 118 and an API gateway 120. As with the access management system 110, the access management system 118 allows users to create and manage users, roles, and groups, and use permissions to allow or deny access to cloud services and resources. The access management system 110 of the network-based data warehouse system 102 and the access management system 118 of the cloud computing storage platform 104 can communicate and share information so as to enable access and management of resources and services shared by users of both the network-based data warehouse system 102 and the cloud computing storage platform 104. The API gateway 120 handles tasks involved in accepting and processing concurrent API calls, including traffic management, authorization and access control, monitoring, and API version management. The API gateway 120 provides HTTP proxy service for creating, publishing, maintaining, securing, and monitoring APIs (e.g., REST APIs).

In some embodiments, communication links between elements of the shared data processing platform 100 are implemented via one or more data communication networks. These data communication networks may utilize any communication protocol and any type of communication medium. In some embodiments, the data communication networks are a combination of two or more data communication networks (or sub-networks) coupled to one another. In alternate embodiments, these communication links are implemented using any type of communication medium and any communication protocol.

As shown in FIG. 1, data storage devices 124-1 to 124-N are decoupled from the computing resources associated with the execution platform 114. That is, new virtual warehouses can be created and terminated in the execution platform 114 and additional data storage devices can be created and terminated on the 104 in an independent manner. This architecture supports dynamic changes to the network-based data warehouse system 102 based on the changing data storage/retrieval needs as well as the changing needs of the users and systems accessing the shared data processing platform 100. The support of dynamic changes allows network-based data warehouse system 102 to scale quickly in response to changing demands on the systems and components within network-based data warehouse system 102. The decoupling of the computing resources from the data storage devices supports the storage of large amounts of data without requiring a corresponding large amount of computing resources. Similarly, this decoupling of resources supports a significant increase in the computing resources utilized at a particular time without requiring a corresponding increase in the available data storage resources. Additionally, the decoupling of resources enables different accounts to handle creating additional compute resources to process data shared by other users without affecting the other user's systems. For instance, a data provider may have three compute resources and share data with a data consumer, and the data consumer may generate new compute resources to execute queries against the shared data, where the new compute resources are managed by the data consumer and do not affect or interact with the compute resources of the data provider.

Compute service manager 112, database 116, execution platform 114, cloud computing storage platform 104, and remote computing device 106 are shown in FIG. 1 as individual components. However, each of compute service manager 112, database 116, execution platform 114, cloud computing storage platform 104, and remote computing environment may be implemented as a distributed system (e.g., distributed across multiple systems/platforms at multiple geographic locations) connected by APIs and access information (e.g., tokens, login data). Additionally, each of compute service manager 112, database 116, execution platform 114, and cloud computing storage platform 104 can be scaled up or down (independently of one another) depending on changes to the requests received and the changing needs of shared data processing platform 100. Thus, in the described embodiments, the network-based data warehouse system 102 is dynamic and supports regular changes to meet the current data processing needs.

During typical operation, the network-based data warehouse system 102 processes multiple jobs (e.g., queries) determined by the compute service manager 112. These jobs are scheduled and managed by the compute service manager 112 to determine when and how to execute the job. For example, the compute service manager 112 may divide the job into multiple discrete tasks and may determine what data is needed to execute each of the multiple discrete tasks. The compute service manager 112 may assign each of the multiple discrete tasks to one or more nodes of the execution platform 114 to process the task. The compute service manager 112 may determine what data is needed to process a task and further determine which nodes within the execution platform 114 are best suited to process the task. Some nodes may have already cached the data needed to process the task (due to the nodes having recently downloaded the data from the cloud computing storage platform 104 for a previous job) and, therefore, be a good candidate for processing the task. Metadata stored in the database 116 assists the compute service manager 112 in determining which nodes in the execution platform 114 have already cached at least a portion of the data needed to process the task. One or more nodes in the execution platform 114 process the task using data cached by the nodes and, if necessary, data retrieved from the cloud computing storage platform 104. It is desirable to retrieve as much data as possible from caches within the execution platform 114 because the retrieval speed is typically much faster than retrieving data from the cloud computing storage platform 104.

As shown in FIG. 1, the shared data processing platform 100 separates the execution platform 114 from the cloud computing storage platform 104. In this arrangement, the processing resources and cache resources in the execution platform 114 operate independently of the data storage resources 124-1 to 124-n in the cloud computing storage platform 104. Thus, the computing resources and cache resources are not restricted to specific data storage resources 124-1 to 124-n. Instead, all computing resources and all cache resources may retrieve data from, and store data to, any of the data storage resources in the cloud computing storage platform 104.

Figure 2:
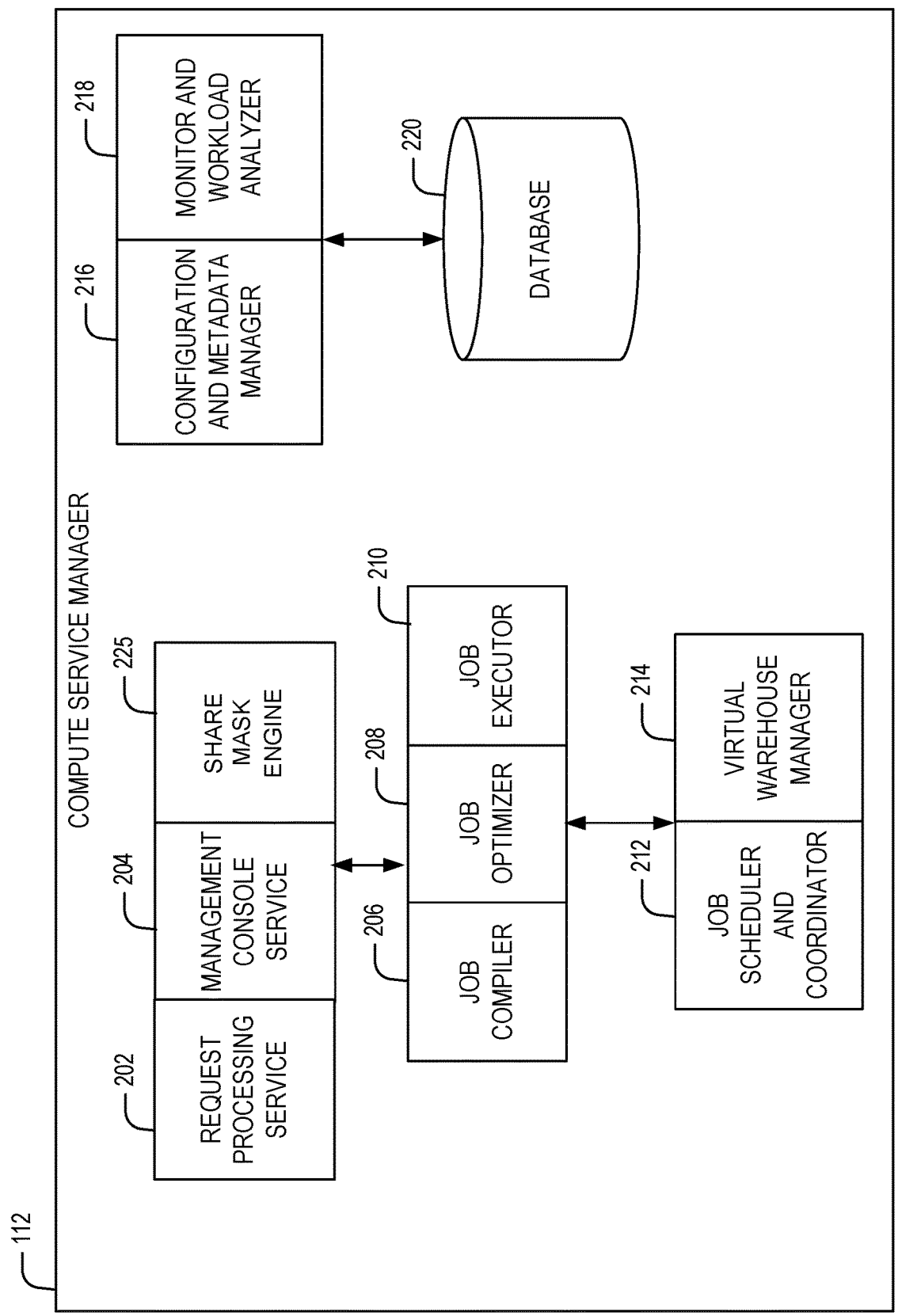
FIG. 2 is a block diagram illustrating components of a compute service manager, according to some example embodiments.

FIG. 2 is a block diagram illustrating components of the compute service manager 112, in accordance with some embodiments of the present disclosure. As shown in FIG. 2, a request processing service 202 manages received data storage requests and data retrieval requests (e.g., jobs to be performed on database data). For example, the request processing service 202 may determine the data necessary to process a received query (e.g., a data storage request or data retrieval request). The data may be stored in a cache within the execution platform 114 or in a data storage device in cloud computing storage platform 104. A management console service 204 supports access to various systems and processes by administrators and other system managers. Additionally, the management console service 204 may receive a request to execute a job and monitor the workload on the system.

The share mask engine 225 manages dynamically masking data managed by the shared data processing platform 100 for different users, based on roles and functions, as discussed in further detail below.

The compute service manager 112 also includes a job compiler 206, a job optimizer 208 and a job executor 210. The job compiler 206 parses a job into multiple discrete tasks and generates the execution code for each of the multiple discrete tasks. The job optimizer 208 determines the best method to execute the multiple discrete tasks based on the data that needs to be processed. The job optimizer 208 also handles various data pruning operations and other data optimization techniques to improve the speed and efficiency of executing the job. The job executor 210 executes the execution code for jobs received from a queue or determined by the compute service manager 112.

A job scheduler and coordinator 212 sends received jobs to the appropriate services or systems for compilation, optimization, and dispatch to the execution platform 114. For example, jobs may be prioritized and processed in that prioritized order. In an embodiment, the job scheduler and coordinator 212 determines a priority for internal jobs that are scheduled by the compute service manager 112 with other "outside" jobs such as user queries that may be scheduled by other systems in the database but may utilize the same processing resources in the execution platform 114. In some embodiments, the job scheduler and coordinator 212 identifies or assigns particular nodes in the execution platform 114 to process particular tasks. A virtual warehouse manager 214 manages the operation of multiple virtual warehouses implemented in the execution platform 114. As discussed below, each virtual warehouse includes multiple execution nodes that each include a cache and a processor (e.g., a virtual machine, a operating system level container execution environment).

Additionally, the compute service manager 112 includes a configuration and metadata manager 216, which manages the information related to the data stored in the remote data storage devices and in the local caches (i.e., the caches in execution platform 114). The configuration and metadata manager 216 uses the metadata to determine which data micro-partitions need to be accessed to retrieve data for processing a particular task or job. A monitor and workload analyzer 218 oversee processes performed by the compute service manager 112 and manages the distribution of tasks (e.g., workload) across the virtual warehouses and execution nodes in the execution platform 114. The monitor and workload analyzer 218 also redistribute tasks, as needed, based on changing workloads throughout the network-based data warehouse system 102 and may further redistribute tasks based on a user (e.g., "external") query workload that may also be processed by the execution platform 114. The configuration and metadata manager 216 and the monitor and workload analyzer 218 are coupled to a data storage device 220. Data storage device 220 in FIG. 2 represent any data storage device within the network-based data warehouse system 102. For example, data storage device 220 may represent caches in execution platform 114, storage devices in cloud computing storage platform 104, or any other storage device.

Figure 3:
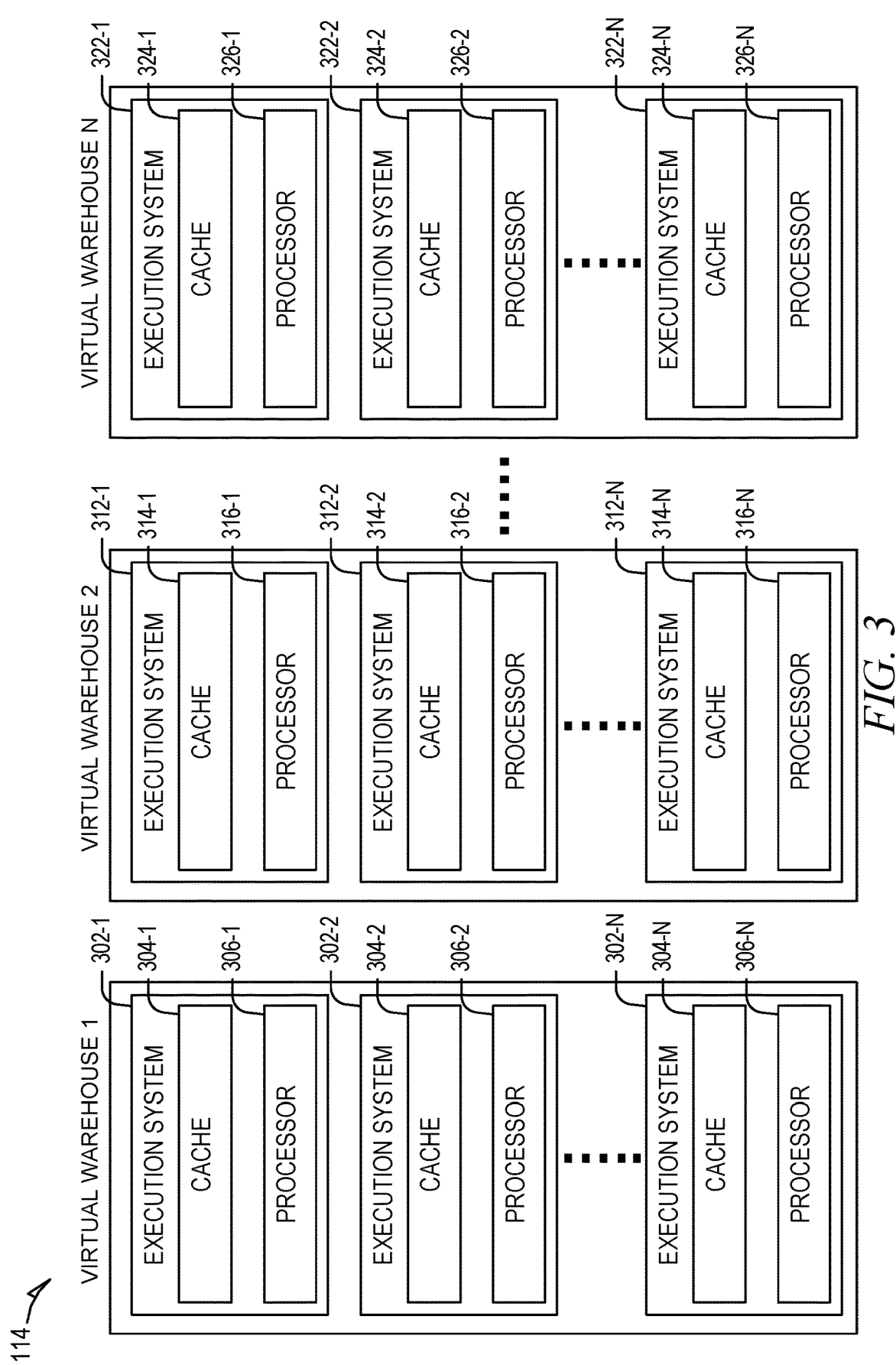
FIG. 3 is a block diagram illustrating components of an execution platform, according to some example embodiments.

FIG. 3 is a block diagram illustrating components of the execution platform 114, in accordance with some embodiments of the present disclosure. As shown in FIG. 3, execution platform 114 includes multiple virtual warehouses, which are elastic clusters of compute instances, such as virtual machines. In the example illustrated, the virtual warehouses include virtual warehouse 1, virtual warehouse 2, and virtual warehouse n. Each virtual warehouse (e.g., EC2 cluster) includes multiple execution nodes (e.g., virtual machines) that each include a data cache and a processor. The virtual warehouses can execute multiple tasks in parallel by using the multiple execution nodes. As discussed herein, execution platform 114 can add new virtual warehouses and drop existing virtual warehouses in real-time based on the current processing needs of the systems and users. This flexibility allows the execution platform 114 to quickly deploy large amounts of computing resources when needed without being forced to continue paying for those computing resources when they are no longer needed. All virtual warehouses can access data from any data storage device (e.g., any storage device in cloud computing storage platform 104).

Although each virtual warehouse shown in FIG. 3 includes three execution nodes, a particular virtual warehouse may include any number of execution nodes. Further, the number of execution nodes in a virtual warehouse is dynamic, such that new execution nodes are created when additional demand is present, and existing execution nodes are deleted when they are no longer necessary (e.g., upon a query or job completion).

Each virtual warehouse is capable of accessing any of the data storage devices 124-1 to 124-n shown in FIG. 1. Thus, the virtual warehouses are not necessarily assigned to a specific data storage device 124-1 to 124-n and, instead, can access data from any of the data storage devices 124-1 to 124-n within the cloud computing storage platform 104. Similarly, each of the execution nodes shown in FIG. 3 can access data from any of the data storage devices 124-1 to 124-n. For instance, the storage device 124-1 of a first user (e.g. provider account user) may be shared with a worker node in a virtual warehouse of another user (e.g., consumer account user), such that the another user can create a database (e.g. read only database) and use the data in storage device 124-1 directly without needing to copy the data (e.g., copy it to new disk managed by the consumer account user). In some embodiments, a particular virtual warehouse or a particular execution node may be temporarily assigned to a specific data storage device, but the virtual warehouse or execution node may later access data from any other data storage device.

In the example of FIG. 3, virtual warehouse 1 includes three execution nodes 302-1, 302-2, and 302-n. Execution node 302-1 includes a cache 304-1 and a processor 306-1. Execution node 302-2 includes a cache 304-2 and a processor 306-2. Execution node 302-n includes a cache 304-n and a processor 306-n. Each execution node 302-1, 302-2, and 302-n is associated with processing one or more data storage and/or data retrieval tasks. For example, a virtual warehouse may handle data storage and data retrieval tasks associated with an internal service, such as a clustering service, a materialized view refresh service, a file compaction service, a storage procedure service, or a file upgrade service. In other implementations, a particular virtual warehouse may handle data storage and data retrieval tasks associated with a particular data storage system or a particular category of data.

Similar to virtual warehouse 1 discussed above, virtual warehouse 2 includes three execution nodes 312-1, 312-2, and 312-n. Execution node 312-a includes a cache 314-1 and a processor 316-1. Execution node 312-n includes a cache 314-n and a processor 316-n. Execution node 312-n includes a cache 314-n and a processor 316-n. Additionally, virtual warehouse 3 includes three execution nodes 322-1, 322-2, and 322-n. Execution node 322-1 includes a cache 324-1 and a processor 326-1. Execution node 322-2 includes a cache 324-2 and a processor 326-2. Execution node 322-n includes a cache 324-n and a processor 326-n.

In some embodiments, the execution nodes shown in FIG. 3 are stateless with respect to the data the execution nodes are caching. For example, these execution nodes do not store or otherwise maintain state information about the execution node, or the data being cached by a particular execution node. Thus, in the event of an execution node failure, the failed node can be transparently replaced by another node. Since there is no state information associated with the failed execution node, the new (replacement) execution node can easily replace the failed node without concern for recreating a particular state.

Although the execution nodes shown in FIG. 3 each include one data cache and one processor, alternate embodiments may include execution nodes containing any number of processors and any number of caches. Additionally, the caches may vary in size among the different execution nodes. The caches shown in FIG. 3 store, in the local execution node (e.g., local disk), data that was retrieved from one or more data storage devices in cloud computing storage platform 104 (e.g., S3 objects recently accessed by the given node). In some example embodiments, the cache stores file headers and individual columns of files as a query downloads only columns necessary for that query.

To improve cache hits and avoid overlapping redundant data stored in the node caches, the job optimizer 208 assigns input file sets to the nodes using consistent hashing scheme to hash over table file names of the data accessed (e.g., data in database 116 or database 122). Subsequent or concurrent queries accessing the same table file will therefor be performed on the same node, according to some example embodiments.

As discussed, the nodes and virtual warehouses may change dynamically in response to environmental conditions (e.g., disaster scenarios, hardware/software issues (e.g., malfunctions), or administrative changes (e.g., changing from a large cluster to smaller cluster to lower costs). In some example embodiments, when the set of nodes changes, no data is reshuffled immediately. Instead, the least recently used replacement policy is implemented to eventually replace the lost cache contents over multiple jobs. Thus, the caches reduce or eliminate the bottleneck problems occurring in platforms that consistently retrieve data from remote storage systems. Instead of repeatedly accessing data from the remote storage devices, the systems and methods described herein access data from the caches in the execution nodes which is significantly faster and avoids the bottleneck problem discussed above. In some embodiments, the caches are implemented using high-speed memory devices that provide fast access to the cached data. Each cache can store data from any of the storage devices in the cloud computing storage platform 104.

Further, the cache resources and computing resources may vary between different execution nodes. For example, one execution node may contain significant computing resources and minimal cache resources, making the execution node useful for tasks that require significant computing resources. Another execution node may contain significant cache resources and minimal computing resources, making this execution node useful for tasks that require caching of large amounts of data. Yet another execution node may contain cache resources providing faster input-output operations, useful for tasks that require fast scanning of large amounts of data. In some embodiments, the execution platform 114 implements skew handling to distribute work amongst the cache resources and computing resources associated with a particular execution, where the distribution may be further based on the expected tasks to be performed by the execution nodes. For example, an execution node may be assigned more processing resources if the tasks performed by the execution node become more processor-intensive. Similarly, an execution node may be assigned more cache resources if the tasks performed by the execution node require a larger cache capacity. Further, some nodes may be executing much slower than others due to various issues (e.g., virtualization issues, network overhead). In some example embodiments, the imbalances are addressed at the scan level using a file stealing scheme. In particular, whenever a node process completes scanning its set of input files, it requests additional files from other nodes. If the one of the other nodes receives such a request, the node analyzes its own set (e.g., how many files are left in the input file set when the request is received), and then transfers ownership of one or more of the remaining files for the duration of the current job (e.g., query). The requesting node (e.g., the file stealing node) then receives the data (e.g., header data) and downloads the files from the cloud computing storage platform 104 (e.g., from data storage device 124-1), and does not download the files from the transferring node. In this way, lagging nodes can transfer files via file stealing in a way that does not worsen the load on the lagging nodes.

Although virtual warehouses 1, 2, and n are associated with the same execution platform 114, the virtual warehouses may be implemented using multiple computing systems at multiple geographic locations. For example, virtual warehouse 1 can be implemented by a computing system at a first geographic location, while virtual warehouses 2 and n are implemented by another computing system at a second geographic location. In some embodiments, these different computing systems are cloud-based computing systems maintained by one or more different entities.

Additionally, each virtual warehouse is shown in FIG. 3 as having multiple execution nodes. The multiple execution nodes associated with each virtual warehouse may be implemented using multiple computing systems at multiple geographic locations. For example, an instance of virtual warehouse 1 implements execution nodes 302-1 and 302-2 on one computing platform at a geographic location and implements execution node 302-*n* at a different computing platform at another geographic location. Selecting particular computing systems to implement an execution node may depend on various factors, such as the level of resources needed for a particular execution node (e.g., processing resource requirements and cache requirements), the resources available at particular computing systems, communication capabilities of networks within a geographic location or between geographic locations, and which computing systems are already implementing other execution nodes in the virtual warehouse.

Execution platform 114 is also fault tolerant. For example, if one virtual warehouse fails, that virtual warehouse is quickly replaced with a different virtual warehouse at a different geographic location.

A particular execution platform 114 may include any number of virtual warehouses. Additionally, the number of virtual warehouses in a particular execution platform is dynamic, such that new virtual warehouses are created when additional processing and/or caching resources are needed. Similarly, existing virtual warehouses may be deleted when the resources associated with the virtual warehouse are no longer necessary.

In some embodiments, the virtual warehouses may operate on the same data in cloud computing storage platform 104, but each virtual warehouse has its own execution nodes with independent processing and caching resources. This configuration allows requests on different virtual warehouses to be processed independently and with no interference between the requests. This independent processing, combined with the ability to dynamically add and remove virtual warehouses, supports the addition of new processing capacity for new users without impacting the performance observed by the existing users.

Figure 4A:
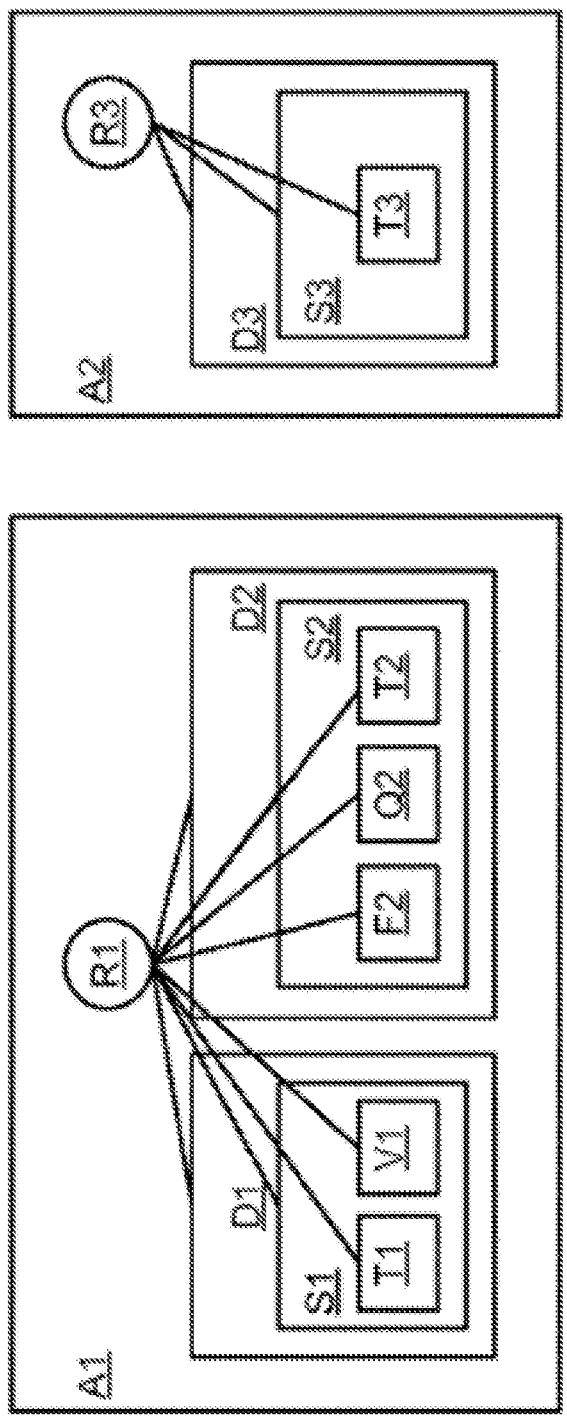
FIGS. 4A-4C show example data architectures for sharing database objects using system, according to some example embodiments.
Figure 4B:
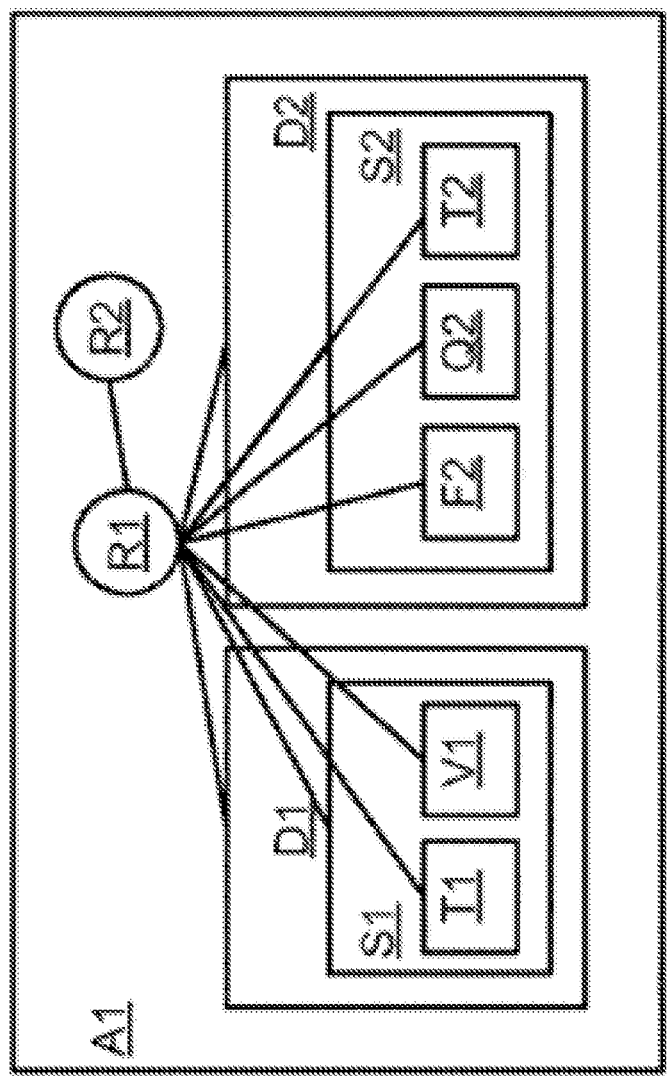
Figure 4C:
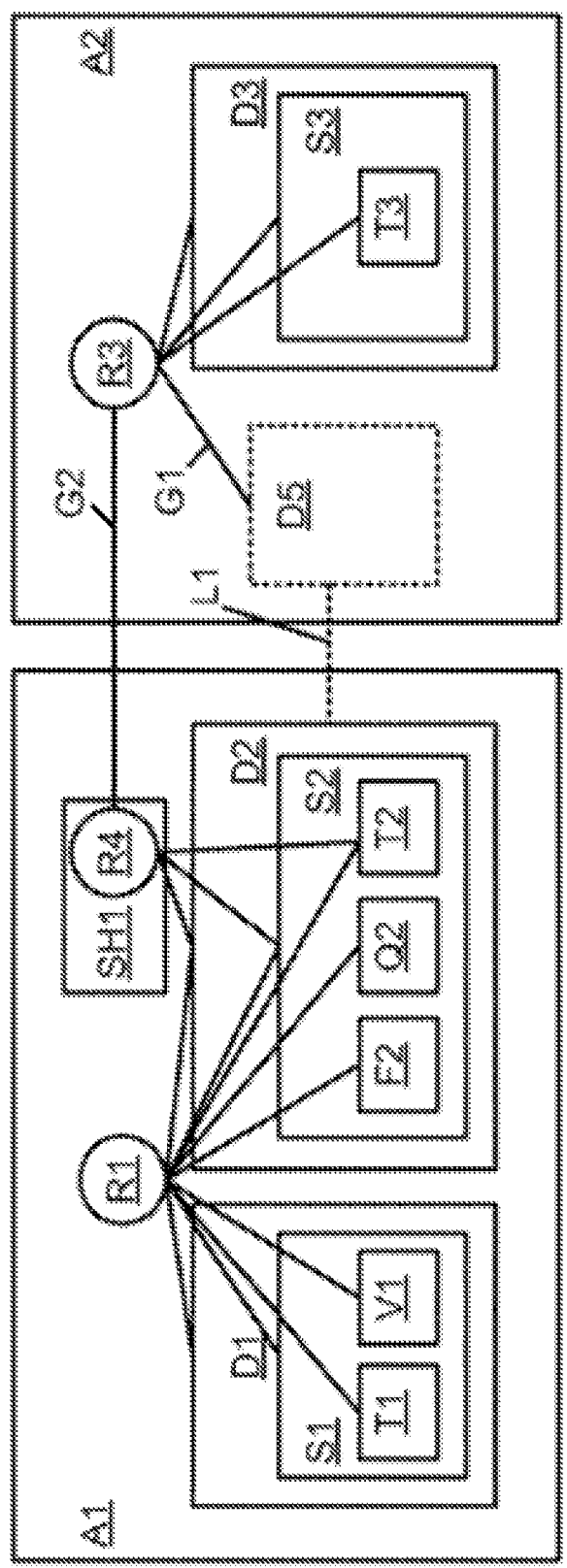

FIGS. 4A-4C show example data architectures for sharing database objects using network-based data warehouse system 102, according to some example embodiments. As discussed the access management system 110 can manage share data for sharing data between storage devices (e.g., different storage devices of a single account or sharing data in a storage device allocated to a first sharer account to a second consumer account). In some example embodiments, the access management system 110 implements role-based access control to govern access to objects in customer accounts. The role-based access control consists of two mechanisms: roles and grants. In one embodiment, roles are special objects in an end-user account (e.g., provider account, consumer account) that are assigned to users. Grants between roles and database objects define what privileges a role has on these objects. For example, a role that has a usage grant on a database can "see" this database when executing the command "show databases"; a role that has a select grant on a table can read from this table but not write to the table. The role would need to have a modify grant on the table to be able to write to it.

FIG. 4A is a schematic block diagram illustrating role-based access to objects in customer accounts of a multitenant shared database platform (e.g., platform 120 as accessed by system 102), according to some example embodiments. In the following examples, a user account "A1" corresponds to a data provider account that manages a data provider virtual warehouse (e.g., virtual warehouse 1 in FIG. 3A) and another different user account A2 corresponds to a data consumer account that initiates data consumer virtual warehouses (e.g., virtual warehouse 2 in FIG. 3A).

As illustrated, the A1 account contains role R1, which has grants to all objects in the object hierarchy. Assuming these grants are usage grants between R1 and database objects D1 and D2, shares S1 and S2, and select grants between R1 and table object T1, view object V1, function object F2, sequence object Q2, table object T2, a user with activated role R1 can see all objects and read data from all tables, views, and sequences and can execute function F2 within account A1.

The account A2 contains role R3, which has grants to all objects in the object hierarchy. Assuming these grants are usage grants between R3 and D3, S3, and select a grant between R3 and T3, a user with activated role R3 can see all objects and read data from all tables, views, and sequences within account A2.

FIG. 4B illustrates a usage grant between roles. With role-based access control, it is also possible to grant usage from one role to another role. A role that has a usage grant to another role "inherits" all access privileges of the other role. For example, in role R2 has a usage grant on role R1. A user (e.g., with corresponding authorization details) with activated role R2 can see and read from all objects because role R2 inherits all grants from role R1.

According to one embodiment, usage grants are granted across different accounts. An account that shares data may be referred to herein as a "sharer account" and an account with which the data is shared may be referred to herein as a "target account". Some embodiments disclosed herein allow for instantaneous, zero-copy, easy-controllable cross-account sharing of data. In some embodiments, in order to share data with another account, a sharer account may generate a share object. Within the share object, a role may be created and a user of the sharer account may indicate access rights or grants that are available to the role and/or foreign accounts (or target accounts) that will be granted rights under the role. A target account may then be able to identify share objects or roles in other account to which the target account has been granted rights or access. In one embodiment, share objects in a sharer account may be imported into the target account using alias objects and cross-account role grants.

The sharer account creates a new type of object, the share object. The share object has a unique name to be identified within the sharer account. For example, the name may need to be unique within an account, but not necessarily across accounts. Share objects may be created, modified, and deleted by referencing them via their name in the sharer account.

In some embodiments, each share object contains a single role. Grants between this role and objects define what objects are being shared and with what privileges these objects are shared. The role and grants may be similar to any other role and grant system in the implementation of role based access control. By modifying the set of grants attached to the role in a share objects, more objects may be shared (by adding grants to the role), fewer objects may be shared (by revoking grants from the role), or objects may be shared with different privileges (by changing the type of grant, for example to allow write access to a shared table object that was previously read-only).

In one embodiment, a share objects also contains a list of references to other customer accounts. Only these accounts that are specifically in the share object may be allowed to look up, access, and/or import from this share object. By modifying the list of references of other customer accounts, the share object can be made accessible to more accounts or be restricted to fewer accounts FIG. 4C is a schematic block diagram illustrating logical grants and links between different accounts. A database alias object DS is created in account A2. Database alias D5 references database D2 via link Ll. Role R3 has a usage grant G1 on database DS. Role R3 has a second usage grant G2 to role R4 in customer account A1. Grant G2 is a cross-account grant between accounts A1 and A2. Role-based access control allows a user in account A2 with activated role R3 to access data in account A1. For example, if a user in account A2 wants to read data in table T2, role-based access control allows that because role R3 has a usage grant of role R4 and role R4, in turn, has a select grant on table T2. By way of illustration, a user with activated role R3 may access T2 by running a query or selection directed to "D5.S2.T2" (where access to T2 is through S2 and D5).

Using object aliases and cross-account grants from a role in the target account to a role in the sharer account allows users in the target account to access information in the sharer account. In this way, a database system may enable sharing of data between different customer accounts in an instantaneous, zero-copy, easy-controllable fashion. The sharing can be instantaneous because alias objects and cross-account grants can be created in milliseconds. The sharing can be zero-copy because no data has to be duplicated in the process. For example, all queries, or selections can be made directly to the shared object in the sharer account without creating a duplicate in the target account. The sharing is also easy to control because it utilizes easy-to-use techniques of role-based access control. Additionally, in embodiments with separated storage and compute, there is no contention among computing resources when executing queries on shared data. Thus, different virtual warehouses in different customer accounts may individually process shared data. For example, a first virtual warehouse for a first account may process a database query or statement using data shared by a sharer account and a second virtual warehouse for a second account, or the sharer account, may process a database query or statement using the shared data of the sharer account.

Figure 5:
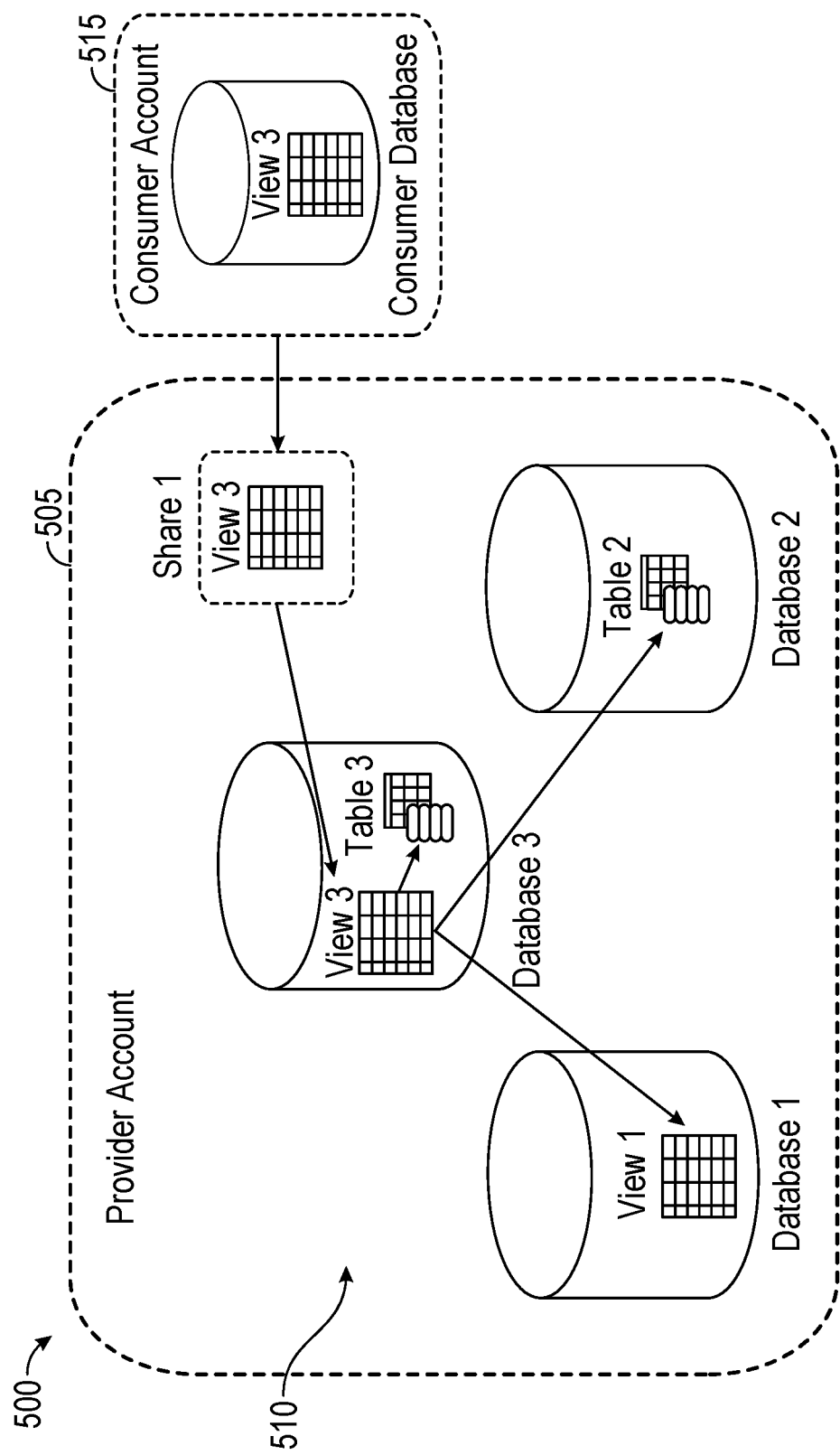
FIG. 5 shows an example database architecture for sharing data between entities using system, according to some example embodiments.

FIG. 5 shows an example database architecture 500 for sharing data between entities (e.g., users) using the shared data processing platform 100, according to some example embodiments. In the example displayed, a data provider account 505 corresponds to a user device (e.g., laptop) of a user (e.g., an account of a first user at a first company, department, etc., that creates and stores data) logged in as an administrator of the data 510. For instance, provider account 505 generates and stores the data in the shared data processing platform 100. The data 510 can include data that is uploaded to the network-based data warehouse system 102 (e.g., for storage in database 116 or caches of nodes in 114, or data that is located on the cloud computing storage platform 104). The consumer account 515 corresponds to a user device of another user (e.g., another user at another company, different department within the same company, etc., using a laptop to login an create an active session of consumer account 515) with which the provider account 505 seeks to share the data 510 via the shared data processing platform 100. For example, data provider account 505 and data consumer account 515 can both be run from different remote computing devices, such as remote computing device 106, that can access, modify or otherwise process data 510 using network-based data warehouse system 102 (e.g., based on permissions, roles, session information managed by access management system 110 and/or access management system 118). In the illustrated example, the data 510 includes databases (e.g., database1, database2, database3). Each database consists of one or more schemes, which are groups of database objects, such as tables (e.g., table2, table3), views (e.g., view1, view3), and shares (e.g., share1).

In tables, the data is relational database data structured as collections of columns and rows, where tables can include references to other tables (e.g., keys, indices, shared columns such as consumer name). For instance, with reference to FIG. 6, a first table 600 comprises three columns (patient name, age, and symptom) with rows for each patient, and a second table 605 comprises two columns (patient name, zip) where the patient names are identical columns used to reference a given patient/user. For instance, a join operation or view can be created from the first table 600 and the second table to show zip codes that different symptoms have appeared (e.g., by creating a view or new table using the patient name, symptom, an zip columns). Although relational database structures are discussed here as examples, it is appreciated that in some example embodiments the data managed by the shared data processing platform 100 can be data structured in a non-relational database format (e.g., no-SQL, Hadoop, Spark frames, etc.).

Returning to FIG. 5, as used here a view is a database object that displays data from one or more tables (e.g., displaying certain columns, with a customized view schema). A view allows the result of a query to be accessed as if the view is itself a table. While views can be utilized to exclude or hide columns to "mask" the data, hiding data using views creates another object that must be managed, and if in a given network environment there are many items to be masked, a large amount of views must be managed, which creates significant overhead and management complexity. Additionally, hiding data using views for masking is agnostic to which role's access see the view (e.g., user engineer sees the same view as the analyst user). Additionally, the views merely create a data object view and do not perform data transformation style operations (e.g., replace first three characters of a name with hashtags). Additionally, sharing views can comprise network security, as the recipient of the view may be able to gain access to the underlying data used to create the view (e.g., access the full table from which columns were pulled to create a given view).

A share is an object that is custom to the shared data processing platform 100 that can be used to share data between users of the network-based data warehouse system 102 in an efficient and secure manner. A share object comprises all information used to share a given database. Each share includes, privileges that grant access to the databases and schema containing the objects to share, the privileges that grant access to specific objects (e.g., tables, secure views), and the consumer accounts with which the database and its objects are shared. After a given database is created (e.g., by data provider account 505) the shared objects can be made available for access and/or manipulation by other users (e.g., the consumer account 515) via cloud computing storage platform 104. For example, the provider account 505 can create one or more database instances and then load the data 510 into the database instances, create views and/or shared objects, and further create consumer accounts (e.g., reader accounts) that can access the database objects via the network-based data warehouse 102 and no data needs to be transferred between the accounts; instead, the shared data is accessed directly on the originating storage device. For instance, the consumer account 515 can login using a browser to access a page, generate a read-only database (e.g., "consumerDatabase"), and populate the shared data (e.g., "view3") in the database for analysis without having to copy data from the storage device that stores the shared data.

Figure 7A:
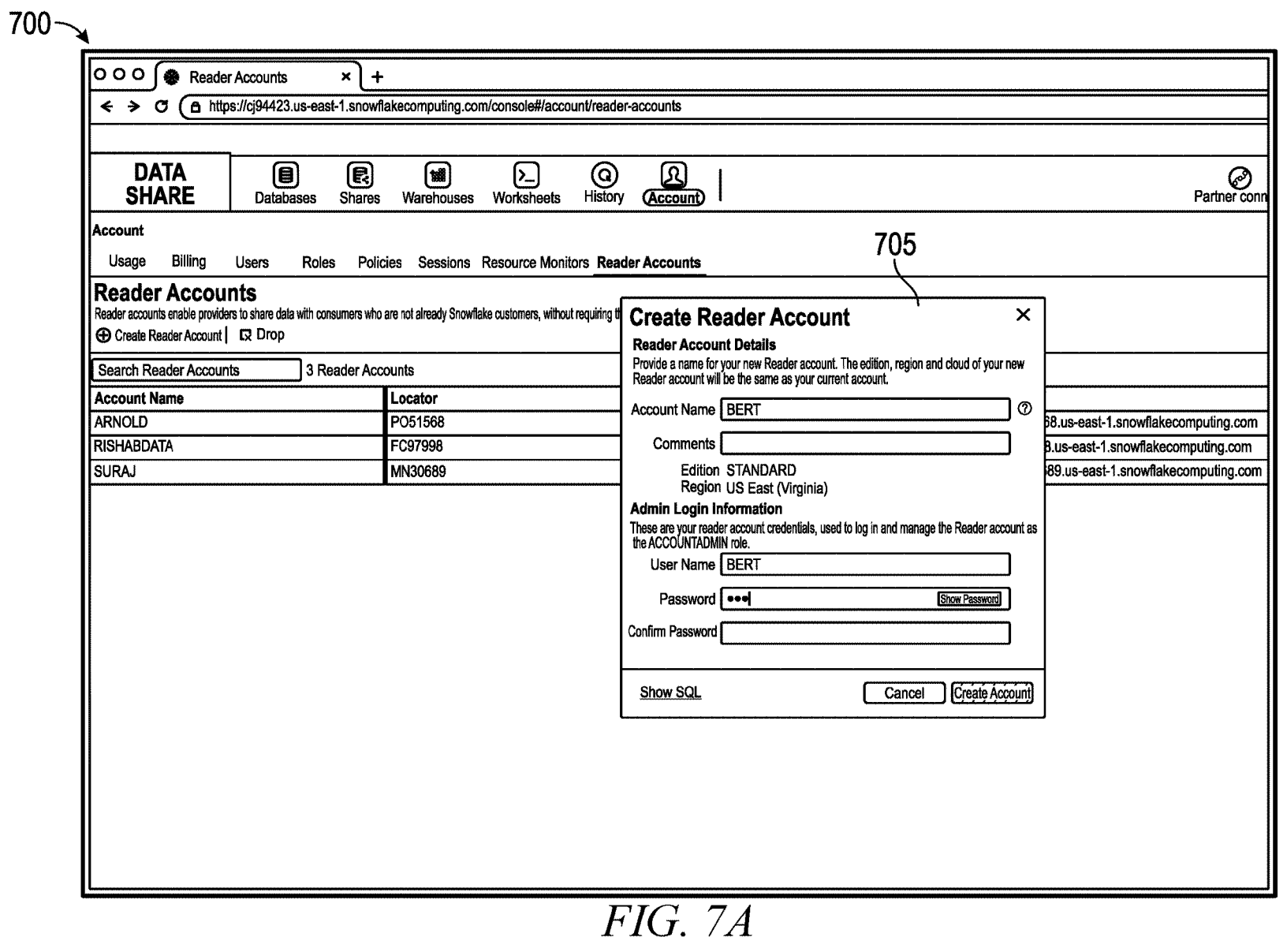
Figure 7B:
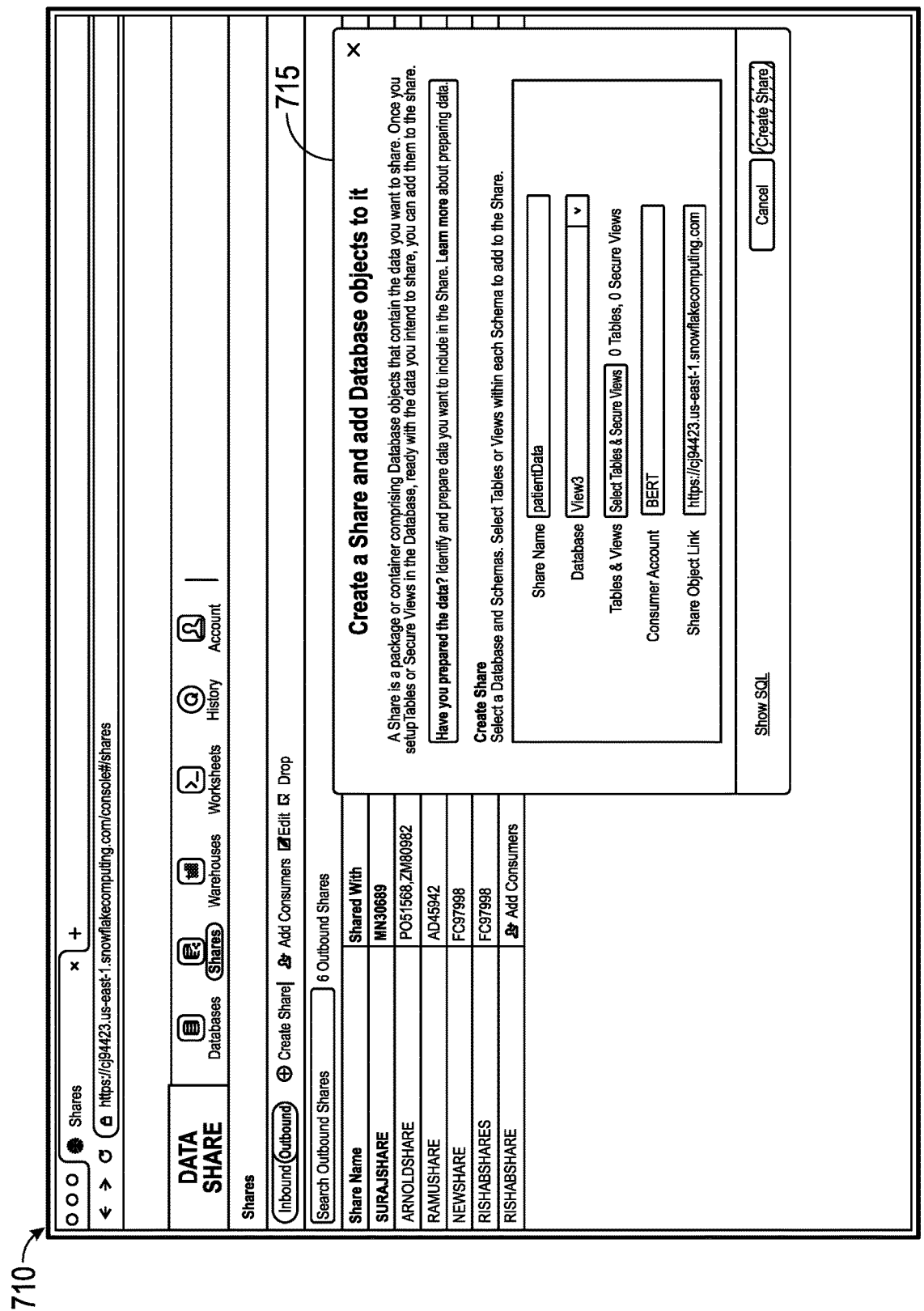
Figure 7C:
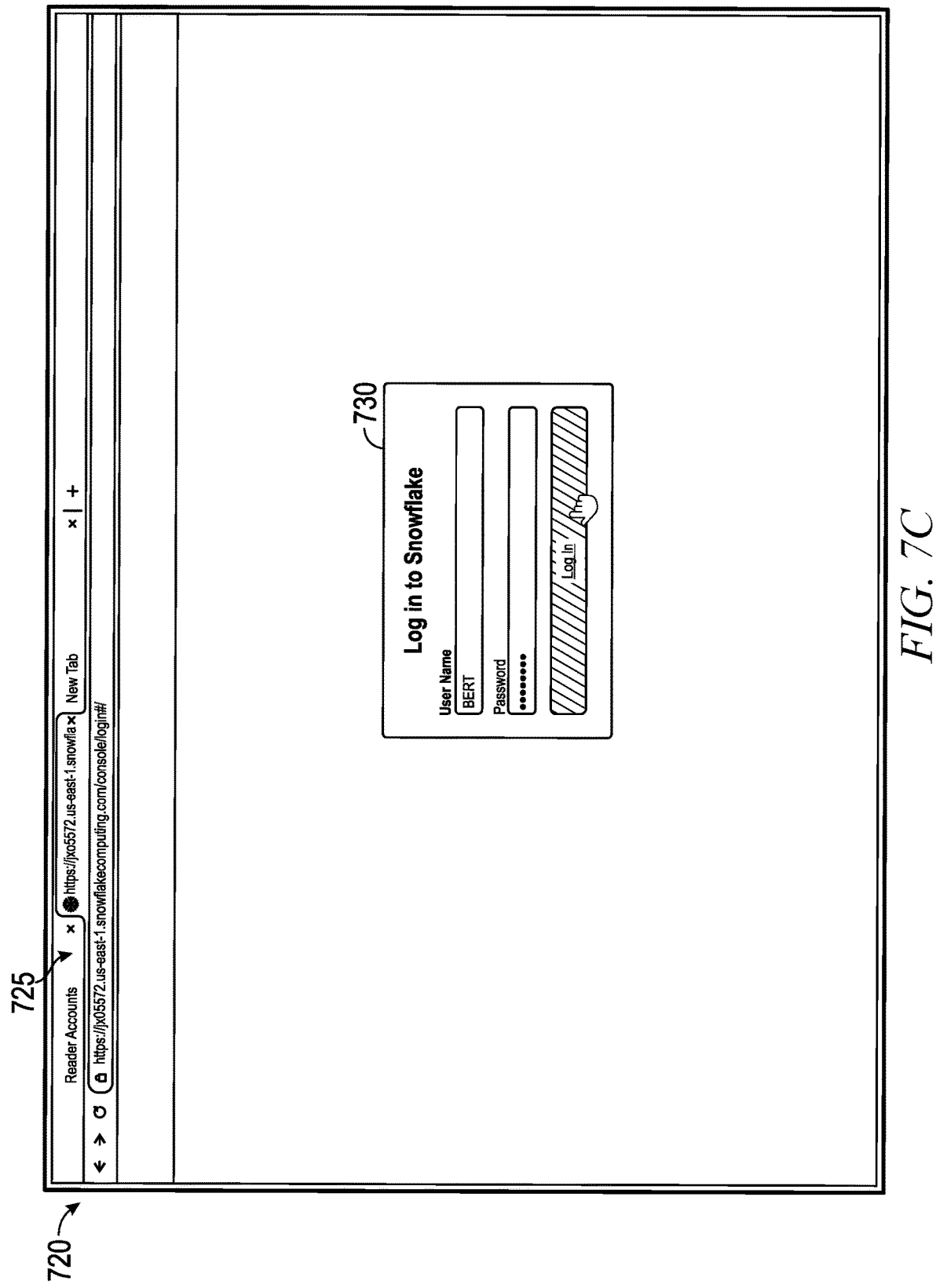
Figure 7D:
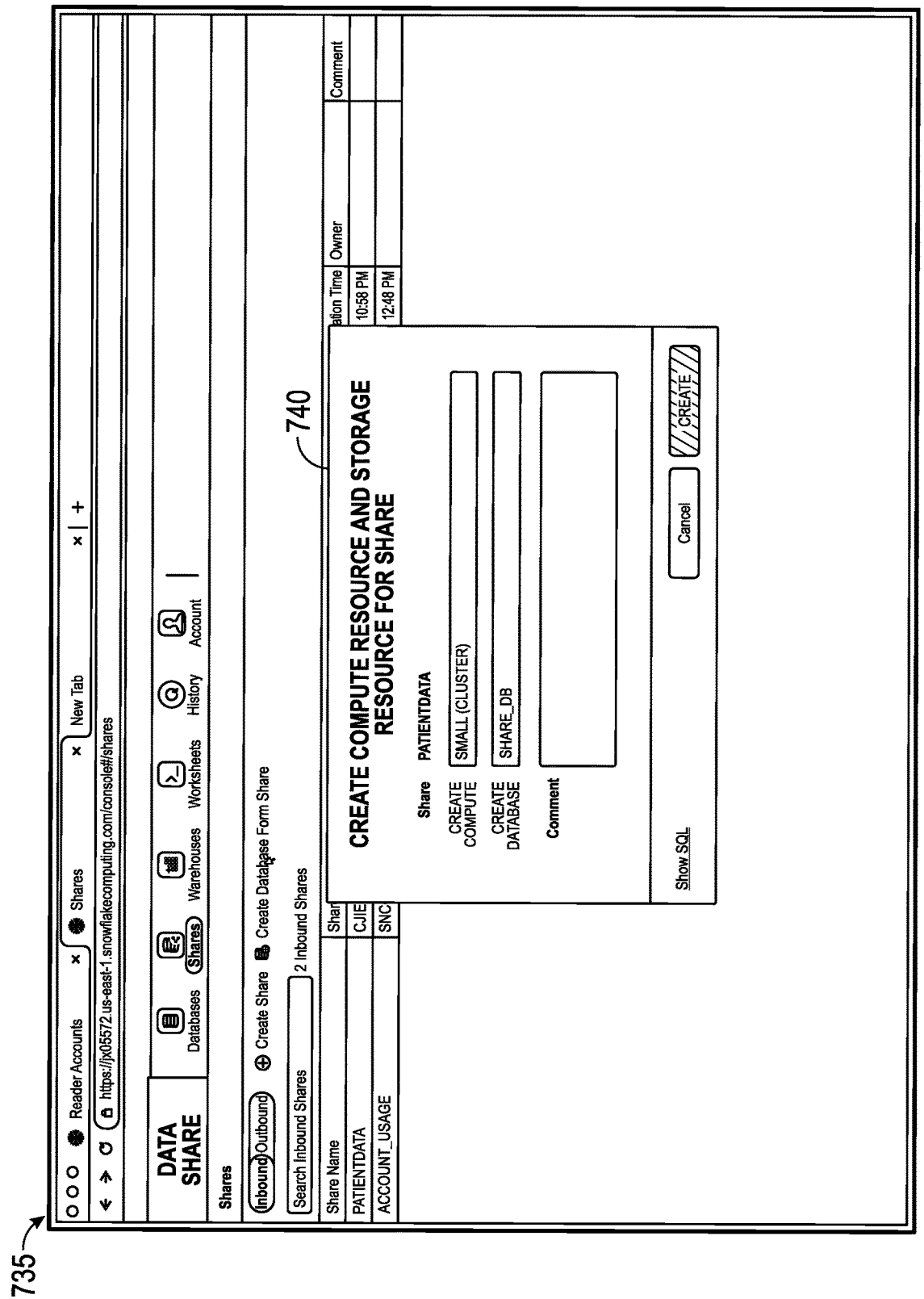
Figure 7E:
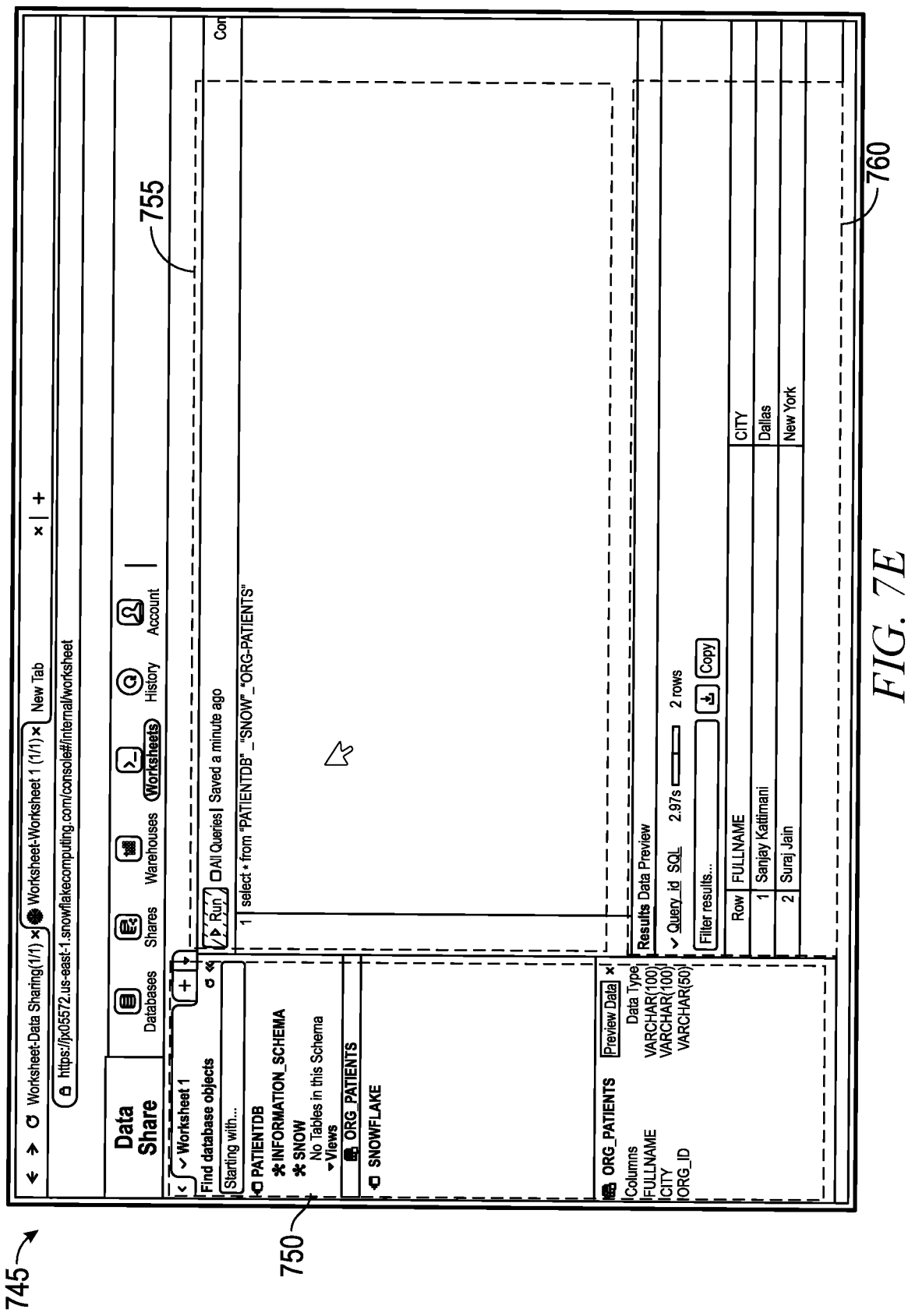

FIGS. 7A-7E show example user interfaces for managing data using the shared data processing platform 100, according to some example embodiments. In the illustrative example, FIGS. 7A and 7B correspond to Internet browser user interfaces displayed on a device of the data provider account 505 (e.g., a laptop) and FIGS. 7C-7E are example Internet browser user interfaces displayed on another device of another user logged in as the consumer account 515. While Internet browser user interfaces are discussed in the illustrated examples, it is appreciated that the user interfaces can similarly be integrated into other applications, such as native applications of a client device operating system (e.g., a mobile application on a smartphone, a Linux application on a Linux laptop, windows application on a Windows enabled laptop, etc.).

In FIG. 7A, the user interface 700 displays a window 705 for creating reader accounts. The window 705 includes fields to create an account name (e.g., the name of the consumer account 515, such as "bert" a data analyst in 3rd party company), and login fields such as a user name field and password field. Upon selecting "Create Account" button in window 705, the consumer account 515 is created and linked to the provider account 505 on the shared data processing platform 100 (e.g., via access management system 110 and access management system 118).

In FIG. 7B, the user interface 710 displays a window 715 for creating a share object and adding database objects (e.g., tables, views) to the share object and specifying share object access (e.g., consumer accounts with which the share object is shared). For example, the "share name" field allows the share object to be named, the "database" field allows database objects to be included in the share object, such as the view3. The window 715 further includes a "consumer account" field that gives access to one or more consumer accounts (e.g., bert) to the shared object, and a Share Object link, which is a URL to the consumer account 515 (e.g., a URL to a network service instance of consumer account 515).

Based on the user selecting the create button in window 715, the share object is created and access to the share object is assigned to the consumer account 515 (e.g., Bert's account). The Share Object link can be copied by the provider account and sent to other users (e.g., Bert) along with login information (e.g., username password) to access and activate the consumer account 515 (e.g., a consumer account session as a network service).

FIG. 7C shows a user interface 720 displaying a login window 730 for accessing share objects, according to some example embodiments. In illustrative example, the user "Bert" receives the share object URL, the username, and password information (e.g., via email) and displays the user interface 720 using the share object URL in an address bar 725 of an Internet Browser. Upon inputting the correct information into the user name and password fields (e.g., the username and password data discussed in FIG. 7A above) and selecting the login button, a consumer account session is activated on the network-based data warehouse system 102 for the consumer account 515. In the consumer account session, the user can create additional database, query data, modify data, and access data objects shared with the consumer account (e.g., the share object created and shared by provider account 505).

FIG. 7D shows a user interface 735 displaying a window 740 that may be used to create a database instance, according to some example embodiments. The user interface 735 can be displayed in response to the login button being selected with the correct information populating the login and password fields. The window 740 can be used by the consumer account 515 to create compute resources (e.g., virtual warehouses) and database instance into which the share object (e.g., a read only database that displays Patient Data) is shared. For instance, using the create compute element, a drop-down menu is displayed that allows the consumer (e.g., data consumer, consumer account 515 to create virtual warehouses of different sizes (e.g., different size EC2 clusters, such as a small cluster, medium cluster, and large cluster), and generate a database on the virtual warehouse where the data populated into the database is from the storage device of the provider account. As discussed, the compute resources and the storage resources are decoupled and the consumer account 515 can manage (e.g., set-up payment, create, alter, terminate) virtual warehouses to access the share object data or other data (e.g., new data generated by another user of the consumer account, which is unrelated to the share object data).

The window 740 further includes identifier ("Share Data") that indicates what shared data will be loaded into the database instance created on the consumer account's virtual warehouse ("Patient Data"), and a database name field that allows the consumer account 515 to name the newly created database that is populated by the share object data. In response to receiving a selection of the create database button in window 740, a new virtual warehouse is generated for the consumer account 515 (e.g., a new EC2 cluster of small size, such as four virtual machines), a new database instance is generated on the new virtual warehouse, and data from the share object is used to populate the database. In this way, the consumer account handles the compute resources without affecting the systems of the data provider (e.g., without affecting a projection server of the database provider that generates and stores data 510).

FIG. 7E shows a user interface 745 for interacting with the share object data, according to some example embodiments. Continuing the example, a user of the consumer account 515 can use user interface 745 to interact with the share object data on the newly created warehouse. For instance, the side panel 750 lists data that is managed by the newly created warehouse, the execution area 755 can receive code to execute against the share object data, and the results of the executed code is displayed in the results area 760. For instance, a user of the consumer account 515 can input a SQL query into the execution area 755, which is then executed against the share object data in the newly created database running on the new warehouse created by the consumer account in FIG. 7D. In this way, users of the consumer accounts can access and interact with live production data of the provider account in a secure manner, where updates to the share object data (e.g., production server updates from which the share object data is derived) occur in real time, and the consumer's computations do not impinge the provider account systems as the computations are performed on a virtual warehouse created and managed consumer account 515.

Figure 8:
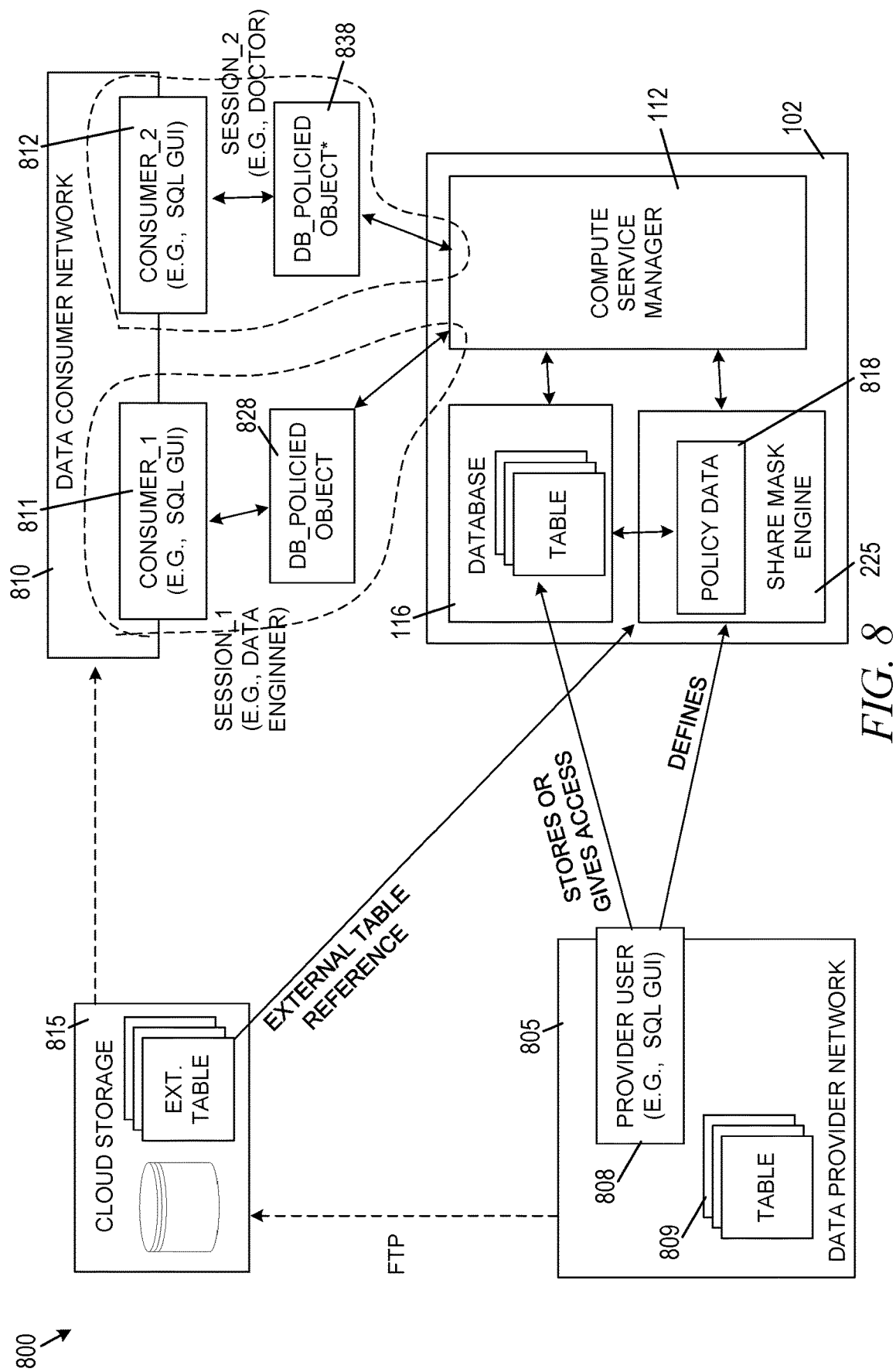
FIG. 8 shows an example data architecture for dynamic masking of shared data objects, according to some example embodiments.

FIG. 8 shows an example data architecture 800 for dynamic masking of shared data objects, according to some example embodiments. In the example of FIG. 8, a data provider network 805 is a network (e.g., private company network of a hospital) with provider users such as provider user 807 that manage provider data, such as tables 809. The data provider network 805 seeks to share access to the tables 809 in a controlled manner with data consumer network 810 (e.g., an infectious disease think-tank). In an example, the provider user 807 is a doctor user of the data provider network 805, and the tables 809 can comprise database objects such as table 600 and table 605 in FIG. 6, and the provider user 807 seeks to share the tables 809 with users in the other company (e.g., data consumer network) for analysis, where the tables 809 undergoes dynamic data masking via share mask engine on the network-based data warehouse system 102. Conventionally, to share data the data provider uploads the data to a network location (e.g., FTP to cloud storage 615) and the data would then be downloaded to the data consumer network 810. This conventional approach is problematic, at least because when the amount of data is large (e.g., as in a global enterprise network), uploading and downloading data may be a very slow if not completely impractical process that incurs large network overheads. Additionally, these approaches have minimal privacy protections as the data is shared in an all-or-nothing approach, in which the data consumer 810 has access to all of the shared data or none of the shared data (e.g., sharing just a few columns would necessitate a new data object be created and then the new data object is shared, which may be equally burdensome and impractical as the size of the data shared grows). Additionally, in the conventional approaches, once the data is sent to the data consumer, the sent data is instantly out of date the moment any changes are made to the original data (e.g., updates to tables 809). While the data consumer network 810 may prefer direct access to the tables 809 (e.g., access to production server data), many data providers will not provide such direct access for privacy or network security concerns (e.g., to comply with legal data privacy laws, to avoid potential malicious network abuse such as hacking).

To address the foregoing, the network-based data warehouse system 102 uses the share mask engine 225 to enable the data provider network 805 (e.g., users in the data provider network such as provider user 808) to share access to the live data with the data consumer network 810 (e.g., users in the data consumer network 810 such as consumer_1 and consumer_2) in a secure mask-able approach, according to some example embodiments. For instance, as illustrated, the provider user 807 can upload the tables 809 to cloud storage 815 and then give access to the network-based data warehouse system 102 to access the cloud storage 815 to retrieve or reference the data (e.g., external tables) for masking and queries. Alternatively or in addition to the cloud-stored data, the provider user 807 can upload some or all of the data to databases in the network-based data warehouse system 102, such as database 116. The provider user 807 specifies one or more policies as policy data 817 that dynamically masks the uploaded data per policy roles and functions as specified by masking rules of a given policy. The policy data 817 can map to locally stored data (e.g., data in database 116) and/or map to data in the cloud storage 815 (e.g., external read only tables) to provide dynamic masking per the policy data 817 when the data is requested by consumers, such as consumer_1 811 and consumer_2 812 via the network-based data warehouse system 102.

The policy data 817 can specify roles and how corresponding data referenced by the policy can be interacted with by users having different roles. For example, the consumer_1 can be designated (e.g., via user account information of consumer_1) as a data engineer role on the network-based data warehouse system 102 and the consumer_2 can be designated (via user account information of consumer_2) as a doctor on the network-based data warehouse system 102. In this example, when the consumers request access to the tables 809 through the network-based data warehouse system 102 (e.g., consumer account session), the share mask engine 225 accesses the policy data 817 and modifies data per the roles and functions in the policy data 817. For instance, the policy data may specify that data engineer roles should not see a given column (e.g., full name of patients) in policied object 827, whereas users with the doctor role (e.g., consumer_2) can see the give column in policied object 837, where seeing can be visibility, untransformed format, or perform manipulations with the data (e.g., join operations to join data from multiple tables).

Figure 6:
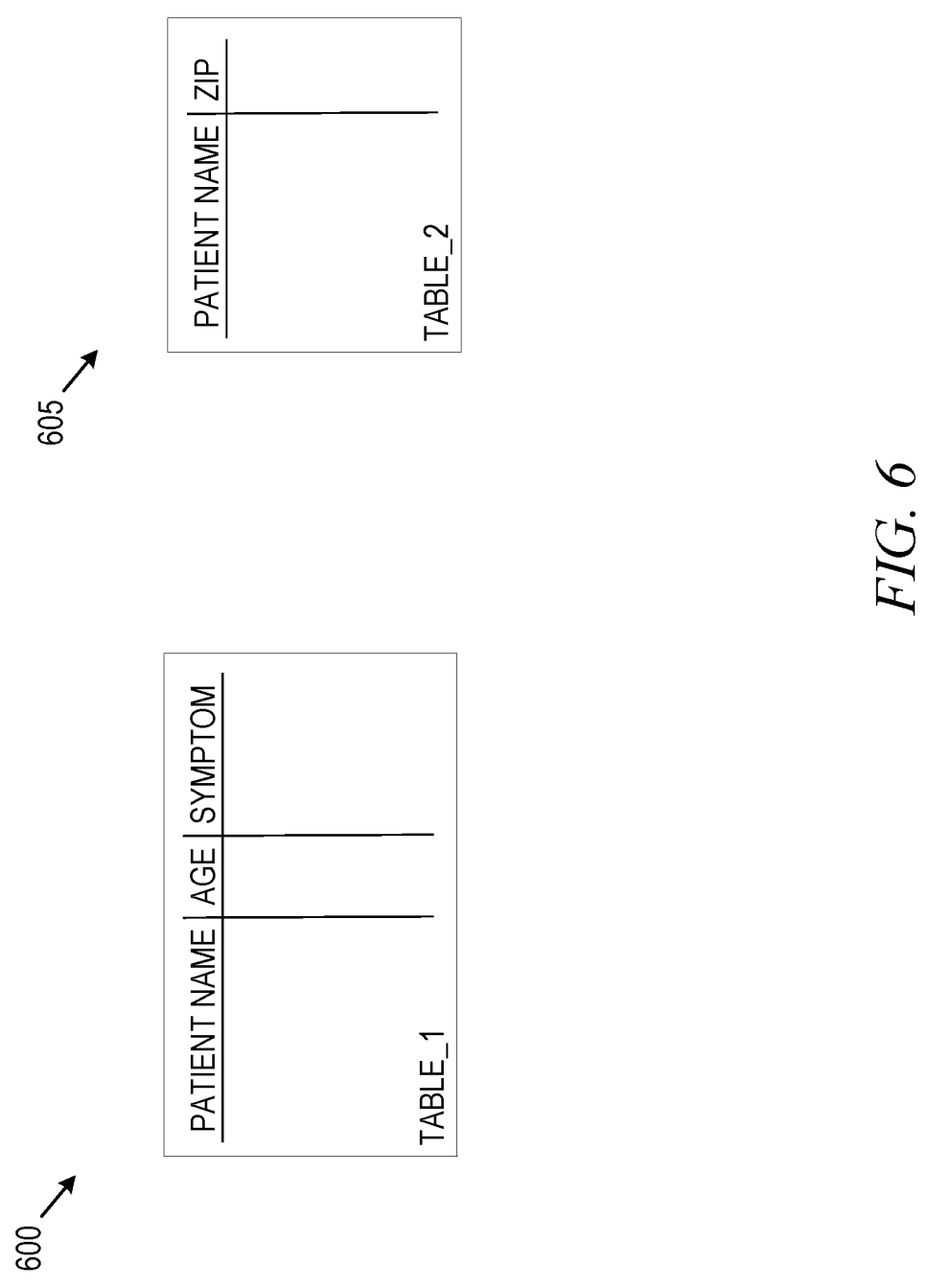

In this way, the users of the data provider network 805 can share portions of the data with the data consumer network 810 in a dynamically masked approach, where the underlying shared data may be from disparate sources. For example, assume table 600 in FIG. 6 is stored in database 116 and is readable and modifiable by the network-based data warehouse system 102, and further assume that table 605 is an external table on cloud storage 815 that is a read only table that can only be referenced by the network-based data warehouse system 102. Given these constraints, the provider user 807 can create a view that is shared where the view pulls data from the first local table (e.g., symptom data for a given customer) and also pull data from the second external table (e.g., zip data of a given customer), while optionally including the patient column or transforming the patient name column (e.g., show only the first initial), or anonymize other data (e.g., changing the zip information to regional information such as city, county, or state data), while keeping the accessed share data (e.g., 827 and 837) live and update to date, as the data is masked dynamically (e.g., upon being queried in sessions of the consumer accounts).

Figure 9:
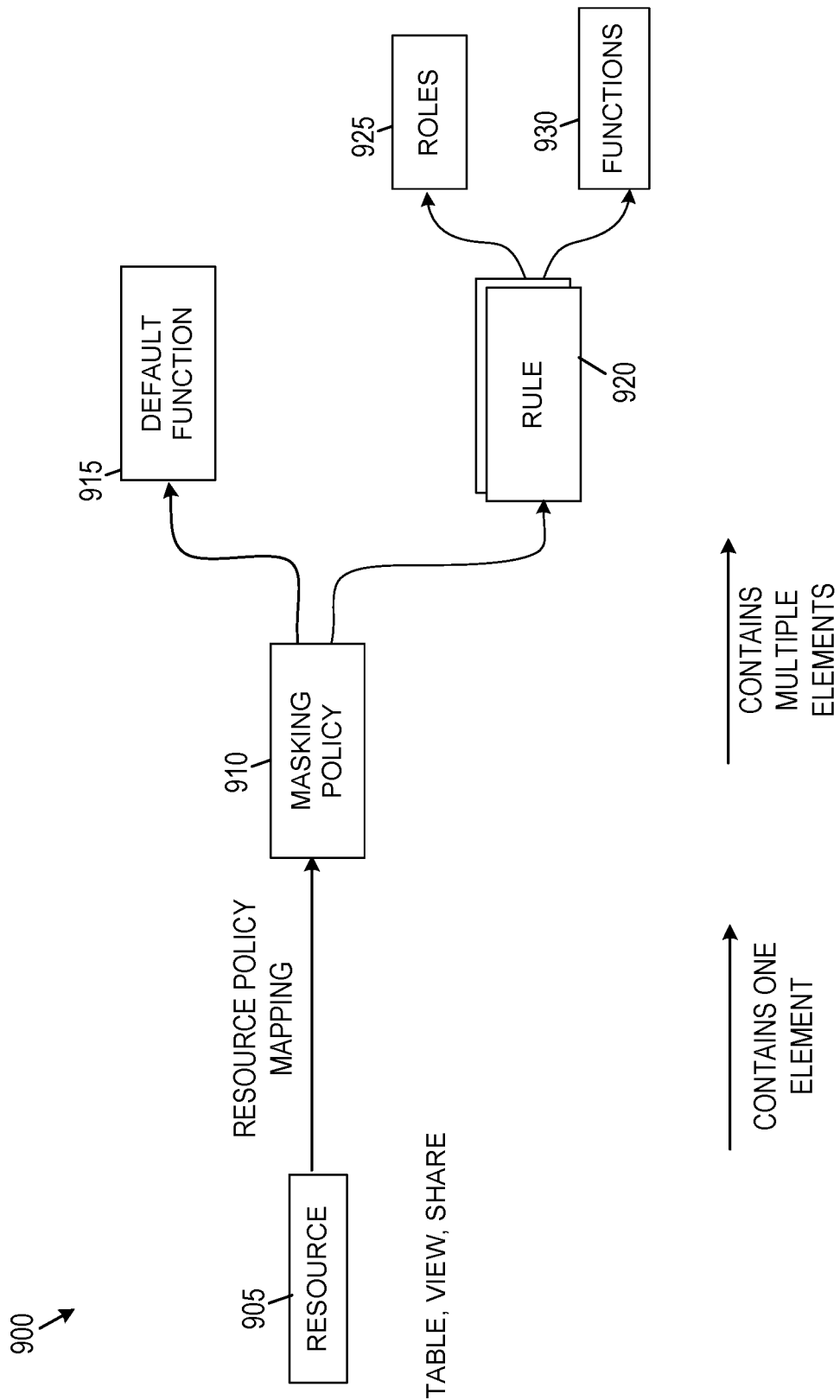
FIG. 9 shows an example policy data architecture, according to some example embodiments.

FIG. 9 shows example policy data architecture 900, according to some example embodiments. The resource 905 is a data store (e.g., database, table, view, share) that is mapped to masking policy 910 comprising one or more rules. In some example embodiments, in response to a given resource 905 being requested (e.g., requested to populate a database of consumer account 515), the share mask engine 225 identifies the masking policy 910 to implement share masking. The masking policy 910 includes one or more rules 920, each of which can comprise one or more roles 925 and one or more functions 930 to implement if the role is fulfilled. That is, the rules 920 are the logic (e.g., if/then), the roles 925 are conditions, and the functions 930 are the operations (e.g., user defined functions (UDFs)) implemented on the resource 905 if the logic and the conditions are satisfied.

A function 930 can be created as a user-defined functions that operate using a query language, such as a SQL UDF that evaluates an SQL expression and returns results of the expression. The expression defining a UDF can refer to the input arguments of the function, and to database objects such as tables, views, and sequences. The UDF owner (e.g., a user defining the UDF) must have appropriate privileges on any database objects that the UDF accesses, according to some example embodiments. A SQL UDF's defining expression can refer to other user-defined functions, though generally the UDF does not recursively refer to itself, either directly or through another function calling back to it. As a simple example, the following SQL statements can be input into execution area 755 to create a function to calculate the area of a circle:

```
::::::::::::::::Code 1 - Begin::::::::::::::::
    CREATE FUNCTION area_of_circle(radius FLOAT)
    RETURNS FLOAT
    AS
    $$
      Pi( ) * radius * radius
    $$
    ;
::::::::::::::::Code 1 - End::::::::::::::::
```

The function can be triggered using a query expression (e.g., the SELECT expression), as follows:

```
::::::::::::::::Code 2 - Begin::::::::::::::::
SELECT area_of_circle(1.0);
::::::::::::::::Code 2 - End::::::::::::::::
```

Which returns an output (e.g., displayed in the results area 760 in FIG. 7E) of:

```
::::::::::::::::Code 3 - Begin::::::::::::::::
+---------------------------------+
|    AREA_OF_CIRCLE(1.0) |
| --------------------------------- |
|      3.151592654        |
+---------------------------------+
::::::::::::::::Code 3 - End::::::::::::::::
```

Examples of functions for masking include: hiding a column, masking the first three characters of each entry of a given column (e.g., hiding the area code), masking the first five characters for each row, transform or obfuscate the ZIP (e.g., replace ZIP code information with city or state information to blur where a given patient is located), join data from two tables (e.g., a local table and an external read only data) and return a view, and other types of additional custom user defined operations. It is appreciated that the example functions discussed are only examples, and any database function can be included as function 930. In some example embodiments, the masking policy 910 for the given resource 905 maps to a default function 915, which is implemented if no rule data (e.g., rule 920, roles 925, function 930) has been created. For example, the default function 915 can include: full mask of social security data, or by default give access to only three roles to a given resource 905 (e.g., the CEO, CFO, and GC of a company receive full access to a given resource 905).

Example policy code is included here as an example. The example code can be implemented by the data provider account 505 to create, alter, or terminate policy data by inputting the example code into the execution area 755 (e.g., browser window of an active session). In some example embodiments, the policy code is SQL that is stored in one or more policy tables in policy data 817, which can then be referenced by the share mask engine 225 to dynamically mask data.

The following represents an example syntax used to create a masking policy, according to some example embodiments. In the below examples, each CASE statements represent the whole policy body, where each WHEN . . . THEN . . . clause specifies a rule. A policy can be created with multiple rules and a default function where based on the executing context, e.g., role, share, one rule can be applied. A policy body is a SQL expression which can be specified using a CASE . . . END statement where each WHEN . . . THEN clause acts as a rule. The policy will be evaluated as a SQL expression, therefore, rules are evaluated in order if specified as WHEN . . . THEN clauses in the body, according to some example embodiments. Functions can be executed upon the role matching and any additional conditions included in the WHEN . . . THEN, according to some example embodiments.

```
::::::::::::::::Code 4 - Begin::::::::::::::::
CREATE [ OR REPLACE ] MASKING POLICY <name> AS
(val string) returns
string ->
   CASE
      WHEN current_role( ) IN ('analyst', 'dataeng') THEN
      DB1.UNMASK(val)
//analyst and dataeng are roles, DB1.UNMASK is a path to a UDF
passed the val parameter
      WHEN share( ) IN ('crm_table) THEN DB1.PARTIAL_MASK
      (val, '#') //an
additional condition for a share( )
      ELSE DB1.SCHM1.FULL_MASK(val)
END;
::::::::::::::::Code 4 - End::::::::::::::::
```

The following syntax is to drop a policy, according to some example embodiments.

```
::::::::::::::::Code 5 - Begin::::::::::::::::
DROP MASKING POLICY IF EXISTS zip_mask;
::::::::::::::::Code 5 - End::::::::::::::::
```

The following syntax will alter a masking policy to replace the existing rules with new ones. Additionally, alter can be used to set a new comment for the masking policy, according to some example embodiments.

```
::::::::::::::::Code 6 - Begin::::::::::::::::
ALTER MASKING POLICY IF EXISTS zip_mask
CASE
WHEN EXECUTING_ROLE( ) IN (analyst, data_engineer) THEN
db1.first3digits(number)
WHEN EXECUTING_ROLE( ) IN (engineer, sales, sales_eng) THEN
db1.first5digits(number)
ELSE db1.fullmask(number)
END;
ALTER MASKING POLICY IF EXISTS zip_mask AS
db1.fullmask(number);
// alter an existing masking zip_mask to set a new comment
ALTER MASKING POLICY IF EXISTS zip_mask SET COMMENT =
'location masking policy for user data'
::::::::::::::::Code 6 - End::::::::::::::::
```

It is further appreciated that although SQL is implemented in the above examples, the masking policy can be stored and implemented in other ways, such as storing the policy as JSON data and performing masking using a scripting language (e.g., JavaScript).

Additionally, masking policies for objects can be combined when resource objects are combined, according to some example embodiments. For example, a first masking policy can be mapped to a database table, where one or more columns of the database table in are included in a database view, where the view has its own masking policy mapped to it. In this example embodiments, the first masking policy may be dynamically applied to the database table followed by applying the view masking policy to generate resulting masked data. In this way, the database objects can each have finely tuned policy masks that can be combined in different configurations to create a tightly controlled data share architecture.

Figure 10:
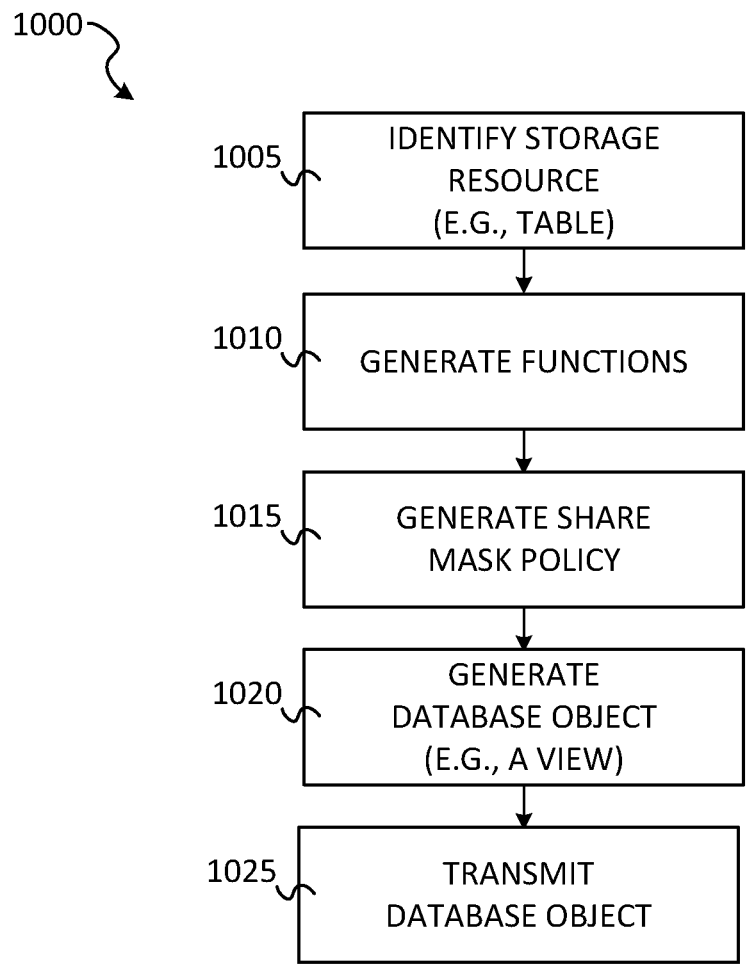
FIG. 10 is a flow diagram of a method for configuring a share mask policy with the resource item, according to some example embodiments.

FIG. 10 shows a flow diagram of a method 1000 for configuring a share mask policy with the resource item, according to some example embodiments. The method 1000 may be embodied in computer-readable instructions for execution by one or more hardware components (e.g., one or more processors) such that the operations of the method 100 may be performed by components of network-based data warehouse system 102. Accordingly, the method 1000 is described below, by way of example with reference thereto. However, it shall be appreciated that the method 1000 may be deployed on various other hardware configurations and is not intended to be limited to deployment within the network-based data warehouse system 102.

At operation 1005, the share mask engine 225 identifies a storage resource from which data can be dynamically masked. For example, at operation 1005 a table containing patient data is selected as a storage resource (e.g., by a user logged into a data provider account) to create a view or share that is dynamically masked.

At operation 1010, the share mask engine 225 stores one or more functions to be included in policy data. For example, at operation 1010 a user defined function is created (e.g., by the data provider or a data engineer/developer) to perform operations on data, such as fully masking a given column, or transforming data in a given column (e.g., transforming ZIP code data into city, county, or region data). In some example embodiments, operation 1010 is optional; for example, where the functions that can be included in a policy have been already created and/or the available functions are stored in a library of functions.

At operation 1015, the share mask engine 225 generates a share mask policy. For example, at operation 1015 the share mask engine 225 stores a policy mapped to the storage resource of operation 1005, and stores further mapping data including role data and functions to implement if the role data matches the user's role of the current session (e.g., a session of a login user requesting access).

At operation 1020, the share mask engine 225 receives data to be dynamically masked from a user of the provider account. The generated database object may be the same as the storage resource object or may be derived from the stored resource object. For example, the storage resource object of operation 1005 may be a table as mentioned, and the database object generated at operation 1020 may be a view that incorporates one or more columns from the table. Because the database object generated at operation 1020 (e.g., the view) includes columns from the dynamically masked storage resource object (e.g., zip column in the table identified at operation 1005), anytime the data the database object (the view) is requested, the corresponding storage resource data is incorporated and the stored share mask policy is initiated for the view.

At operation 1025, the share mask engine 225 receives an instruction from the provider account 505 to transmit the database object. For example, at operation 1025, a user of the provider account 505 emails a link to the view to one or more other users of the network-based data warehouse system 102, such another user of the consumer account 515.

Figure 11:
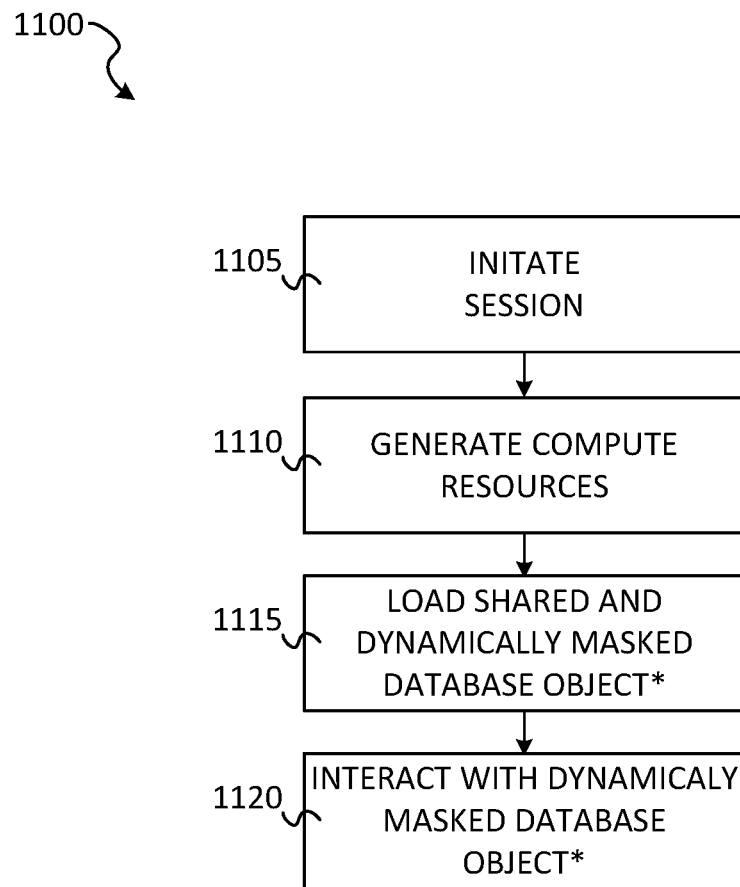
FIG. 11 is a flow diagram of a method for interacting with the dynamically masked data, according to some example embodiments.

FIG. 11 shows a flow diagram of a method 1100 for interacting with the dynamically masked data, according to some example embodiments. The method 1100 may be embodied in computer-readable instructions for execution by one or more hardware components (e.g., one or more processors) such that the operations of the method 1100 may be performed by components of network-based data warehouse system 102. Accordingly, the method 1100 is described below, by way of example with reference thereto. However, it shall be appreciated that the method 1100 may be deployed on various other hardware configurations and is not intended to be limited to deployment within the network-based data warehouse system 102.

At operation 1105, the share mask engine 225 initiates a session for a consumer account of the network-based data warehouse system 102. For example, at operation 1105, the consumer account 515 loads a login screen (FIG. 7C) by inputting a link for the view (received from the provider account 505) into the address bar of a browser, logs in and is presented with a consumer account user interface, such as user interface 735 (FIG. 7D), where the link is for the database object transmitted at 1025 (e.g., the data provider user emails the link to the object to the data consumer user, where the link is access to database object that is to be dynamically masked per method 1000).

At operation 1110, the share mask engine 225 generates compute resources (e.g., virtual warehouses) for use by the consumer account (e.g., the consumer account 515), where the compute resources can be used to instantiate one or more databases to store share data (e.g., masked database objects). For example, as discussed above with reference to FIG. 7D, the consumer account 515 creates one or more virtual warehouses and creates a database instance.

At operation 1115, the share mask engine loads the shared and masked data for the consumer account 515. For example, at operation 1115 the shared data is automatically loaded into the database instance. At operation 1120, the consumer account 515 interacts with the shared data by inputting one or more SQL statements or expressions (e.g., SELECT) into an execution area 755 to query the shared mask object and return results in the results area 760 (FIG. 7E).

Figure 12:
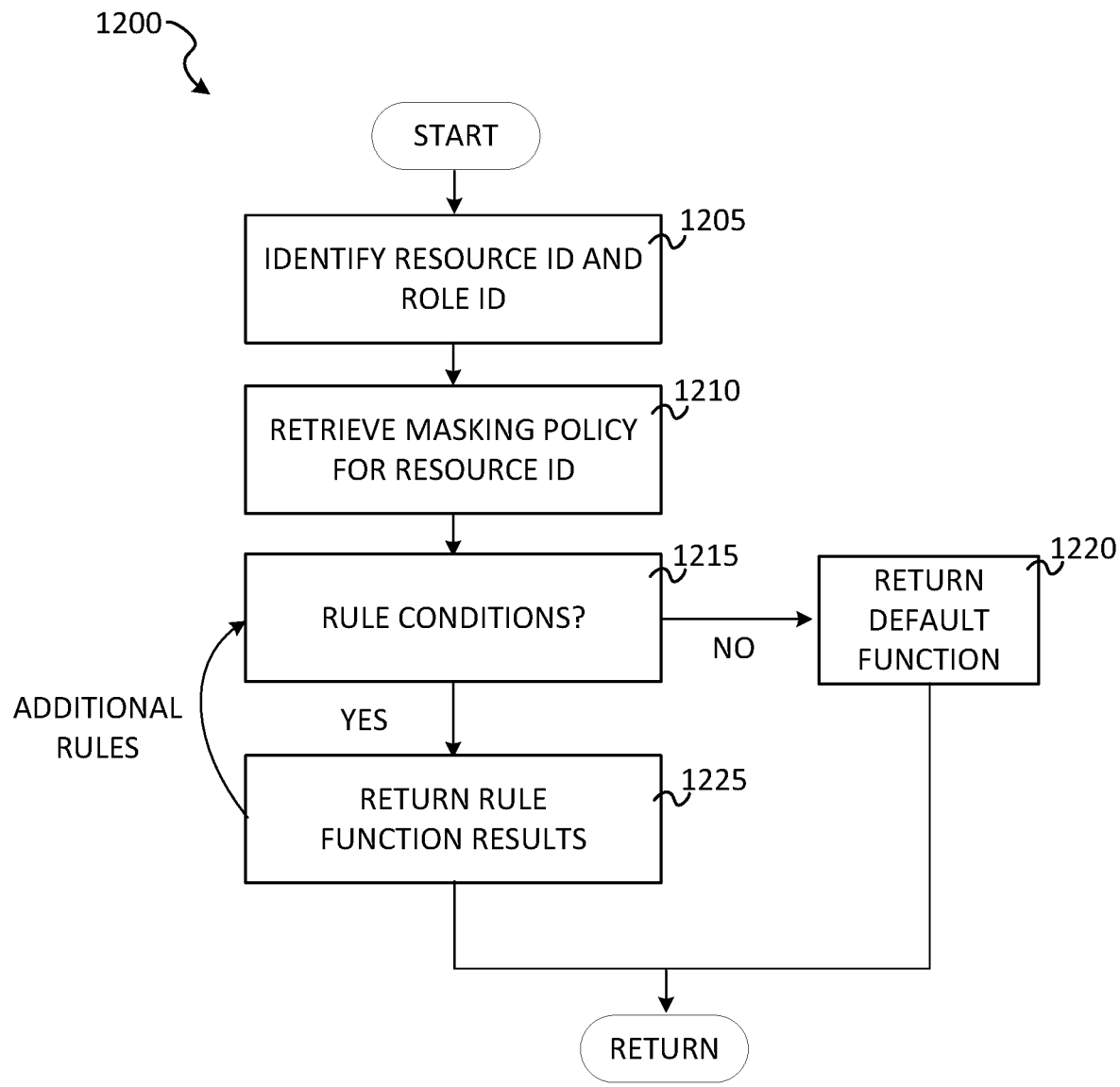
FIG. 12 is a flow diagram of a method for dynamically masking shared a database object, according to some example embodiments.

FIG. 12 shows a flow diagram of a method 1200 for dynamically masking shared a database object, according to some example embodiments. The method 1200 may be implemented as a subroutine that is initiated by an account requesting access to the shared data (e.g., where the shared data maps to a policy, or data from which the shared data is created maps to a policy). For example, in response to the data being loaded (e.g., requested by a consumer account) at operation 1115, the share mask engine 225 can initiate the method 1100.

At operation 1205, the share mask engine 225 identifies a resource ID (e.g., source database table) of the requested data (e.g., a view that incorporates a column from the source database table) and the role ID of the user of the consumer account 515 that is logged into an active session. At operation 1210, the share mask engine 225 retrieves policy data that is mapped to the resource ID. At operation 1215, the share mask engine 225 identifies one or more rules in the policy that for which conditions are satisfied. For example, at operation 1215 the share mask engine 225 determines that the rule matches a specified role (e.g., user role for active session), or matches any other specified rules in the policy (e.g., a share( ) rule). If, at operation 1215, the share mask engine 225 determines that there are no rules that match conditions (e.g., the role ID of the consumer account 515 is a "doctor" role and there are no rules in the policy that specify doctor roles), the method 1200 proceeds to operation 1220 in which a default function of the policy is executed and data is returned as a subroutine result.

Returning to operation 1215, assuming that there are one or more rules for the identified role ID of the consumer account of the active session, the method 1200 proceeds to operation 1225 in which the user defined function of the rule is executed and dynamically masked data is returned for display (e.g., on the user device of the consumer account user). Further, as illustrated, the share mask engine 225 loops back to 1215 if there are additional rules that are defined for the role ID of the consumer account 515 (e.g., a first function may transform data in a given column and a second function may use the transformed data as input data for further transformations or masking operations; e.g., a given role has two functions that are activated, where each function operates independently or concurrently of the other). Assuming there are additional rules, the method 1200 evaluates the rules and returns the rules results at operation 1225 for further rules that match the role ID. After the method 1200 terminates the dynamically masked data is returned by the share mask engine 225 to the consumer account system (e.g. a remote computing device 106 being operated by consumer account 515) for analysis and further interaction (e.g., queries) by the consumer account 515 as discussed in FIG. 11 (e.g., at operation 1120).

Figure 13:
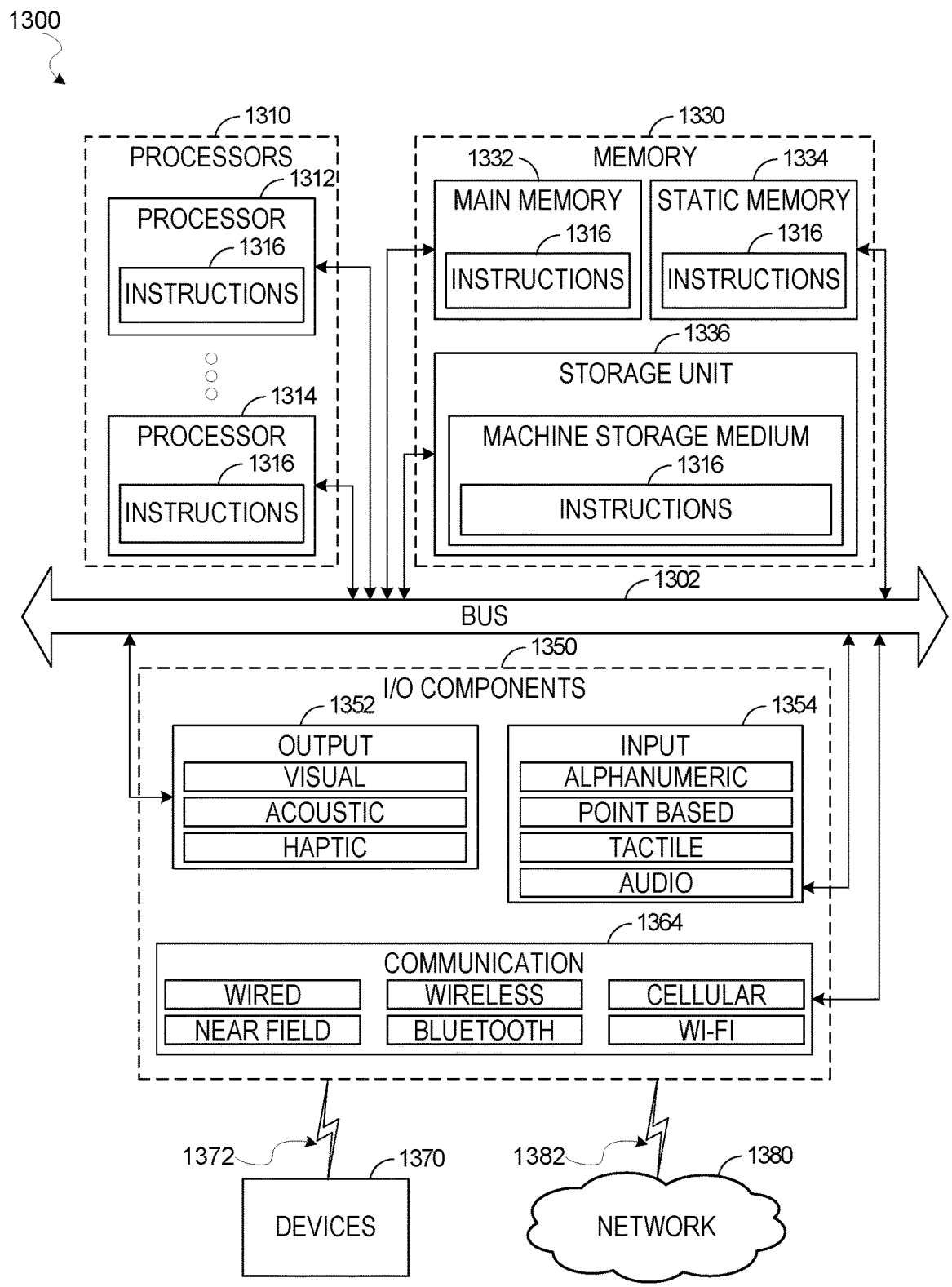
FIG. 13 illustrates a diagrammatic representation of a machine in the form of a computer system within which a set of instructions may be executed for causing the machine to perform any one or more of the methodologies discussed herein, in accordance with some embodiments of the present disclosure.

FIG. 13 illustrates a diagrammatic representation of a machine 1300 in the form of a computer system within which a set of instructions may be executed for causing the machine 1300 to perform any one or more of the methodologies discussed herein, according to an example embodiment. Specifically, FIG. 13 shows a diagrammatic representation of the machine 1300 in the example form of a computer system, within which instructions 1316 (e.g., software, a program, an application, an applet, an app, or other executable code) for causing the machine 1300 to perform any one or more of the methodologies discussed herein may be executed. For example, the instructions 1316 may cause the machine 1300 to execute any one or more operations of any one or more of the methods 1000, 1100, and 1200. As another example, the instructions 1316 may cause the machine 1300 to implemented portions of the data flows illustrated in any one or more of FIGS. 1-9. In this way, the instructions 1316 transform a general, non-programmed machine into a particular machine 1300 (e.g., the remote computing device 106, the access management system 110, the compute service manager 112, the execution platform 113, the access management system 118, the API gateway 120, remote computing device 106 that is specially configured to carry out any one of the described and illustrated functions in the manner described herein.

In alternative embodiments, the machine 1300 operates as a standalone device or may be coupled (e.g., networked) to other machines. In a networked deployment, the machine 1300 may operate in the capacity of a server machine or a client machine in a server-client network environment, or as a peer machine in a peer-to-peer (or distributed) network environment. The machine 1300 may comprise, but not be limited to, a server computer, a client computer, a personal computer (PC), a tablet computer, a laptop computer, a netbook, a smart phone, a mobile device, a network router, a network switch, a network bridge, or any machine capable of executing the instructions 1316, sequentially or otherwise, that specify actions to be taken by the machine 1300. Further, while only a single machine 1300 is illustrated, the term "machine" shall also be taken to include a collection of machines 1300 that individually or jointly execute the instructions 1316 to perform any one or more of the methodologies discussed herein.

The machine 1300 includes processors 1310, memory 1330, and input/output (I/O) components 1350 configured to communicate with each other such as via a bus 1302. In an example embodiment, the processors 1310 (e.g., a central processing unit (CPU), a reduced instruction set computing (RISC) processor, a complex instruction set computing (CISC) processor, a graphics processing unit (GPU), a digital signal processor (DSP), an application-specific integrated circuit (ASIC), a radio-frequency integrated circuit (RFIC), another processor, or any suitable combination thereof) may include, for example, a processor 1312 and a processor 1314 that may execute the instructions 1316. The term "processor" is intended to include multi-core processors 1310 that may comprise two or more independent processors (sometimes referred to as "cores") that may execute instructions 1316 contemporaneously. Although FIG. 13 shows multiple processors 1310, the machine 1300 may include a single processor with a single core, a single processor with multiple cores (e.g., a multi-core processor), multiple processors with a single core, multiple processors with multiple cores, or any combination thereof.

The memory 1330 may include a main memory 1332, a static memory 1334, and a storage unit 1336, all accessible to the processors 1310 such as via the bus 1302. The main memory 1332, the static memory 1334, and the storage unit 1336 store the instructions 1316 embodying any one or more of the methodologies or functions described herein. The instructions 1316 may also reside, completely or partially, within the main memory 1332, within the static memory 1334, within the storage unit 1336, within at least one of the processors 1310 (e.g., within the processor's cache memory), or any suitable combination thereof, during execution thereof by the machine 1300.

The I/O components 1350 include components to receive input, provide output, produce output, transmit information, exchange information, capture measurements, and so on. The specific I/O components 1350 that are included in a particular machine 1300 will depend on the type of machine. For example, portable machines such as mobile phones will likely include a touch input device or other such input mechanisms, while a headless server machine will likely not include such a touch input device. It will be appreciated that the I/O components 1350 may include many other components that are not shown in FIG. 13. The I/O components 1350 are grouped according to functionality merely for simplifying the following discussion and the grouping is in no way limiting. In various example embodiments, the I/O components 1350 may include output components 1352 and input components 1354. The output components 1352 may include visual components (e.g., a display such as a plasma display panel (PDP), a light emitting diode (LED) display, a liquid crystal display (LCD), a projector, or a cathode ray tube (CRT)), acoustic components (e.g., speakers), other signal generators, and so forth. The input components 1354 may include alphanumeric input components (e.g., a keyboard, a touch screen configured to receive alphanumeric input, a photo-optical keyboard, or other alphanumeric input components), point-based input components (e.g., a mouse, a touchpad, a trackball, a joystick, a motion sensor, or another pointing instrument), tactile input components (e.g., a physical button, a touch screen that provides location and/or force of touches or touch gestures, or other tactile input components), audio input components (e.g., a microphone), and the like.

Communication may be implemented using a wide variety of technologies. The I/O components 1350 may include communication components 1364 operable to couple the machine 1300 to a network 1380 or devices 1370 via a coupling 1382 and a coupling 1372, respectively. For example, the communication components 1364 may include a network interface component or another suitable device to interface with the network 1380. In further examples, the communication components 1364 may include wired communication components, wireless communication components, cellular communication components, and other communication components to provide communication via other modalities. The devices 1370 may be another machine or any of a wide variety of peripheral devices (e.g., a peripheral device coupled via a universal serial bus (USB)). For example, as noted above, the machine 1300 may correspond to any one of the remote computing device 106, the access management system 110, the compute service manager 112, the execution platform 113, the access management system 118, the API gateway 120, and the computing devices 203, 207, 307, and 401, and the devices 1370 may include any other of these systems and devices.

The various memories (e.g., 1330, 1332, 1334, and/or memory of the processor(s) 1310 and/or the storage unit 1336) may store one or more sets of instructions 1316 and data structures (e.g., software) embodying or utilized by any one or more of the methodologies or functions described herein. These instructions 1316, when executed by the processor(s) 1310, cause various operations to implement the disclosed embodiments.

As used herein, the terms "machine-storage medium," "device-storage medium," and "computer-storage medium" mean the same thing and may be used interchangeably in this disclosure. The terms refer to a single or multiple storage devices and/or media (e.g., a centralized or distributed database, and/or associated caches and servers) that store executable instructions and/or data. The terms shall accordingly be taken to include, but not be limited to, solid-state memories, and optical and magnetic media, including memory internal or external to processors. Specific examples of machine-storage media, computer-storage media, and/or device-storage media include non-volatile memory, including by way of example semiconductor memory devices, e.g., erasable programmable read-only memory (EPROM), electrically erasable programmable read-only memory (EEPROM), field-programmable gate arrays (FPGAs), and flash memory devices; magnetic disks such as internal hard disks and removable disks; magneto-optical disks; and CD-ROM and DVD-ROM disks. The terms "machine-storage media," "computer-storage media," and "device-storage media" specifically exclude carrier waves, modulated data signals, and other such media, at least some of which are covered under the term "signal medium" discussed below.

In various example embodiments, one or more portions of the network 980 may be an ad hoc network, an intranet, an extranet, a virtual private network (VPN), a local-area network (LAN), a wireless LAN (WLAN), a wide-area network (WAN), a wireless WAN (WWAN), a metropolitan-area network (MAN), the Internet, a portion of the Internet, a portion of the public switched telephone network (PSTN), a plain old telephone service (POTS) network, a cellular telephone network, a wireless network, a Wi-Fi® network, another type of network, or a combination of two or more such networks. For example, the network 1380 or a portion of the network 1380 may include a wireless or cellular network, and the coupling 1382 may be a Code Division Multiple Access (CDMA) connection, a Global System for Mobile communications (GSM) connection, or another type of cellular or wireless coupling. In this example, the coupling 1382 may implement any of a variety of types of data transfer technology, such as Single Carrier Radio Transmission Technology (1×RTT), Evolution-Data Optimized (EVDO) technology, General Packet Radio Service (GPRS) technology, Enhanced Data rates for GSM Evolution (EDGE) technology, third Generation Partnership Project (3GPP) including 3G, fourth generation wireless (4G) networks, Universal Mobile Telecommunications System (UMTS), High-Speed Packet Access (HSPA), Worldwide Interoperability for Microwave Access (WiMAX), Long Term Evolution (LTE) standard, others defined by various standard-setting organizations, other long-range protocols, or other data transfer technology.

The instructions 1316 may be transmitted or received over the network 1380 using a transmission medium via a network interface device (e.g., a network interface component included in the communication components 1364) and utilizing any one of a number of well-known transfer protocols (e.g., hypertext transfer protocol (HTTP)). Similarly, the instructions 1316 may be transmitted or received using a transmission medium via the coupling 1372 (e.g., a peer-to-peer coupling) to the devices 1370. The terms "transmission medium" and "signal medium" mean the same thing and may be used interchangeably in this disclosure. The terms "transmission medium" and "signal medium" shall be taken to include any intangible medium that is capable of storing, encoding, or carrying the instructions 1316 for execution by the machine 1300, and include digital or analog communications signals or other intangible media to facilitate communication of such software. Hence, the terms "transmission medium" and "signal medium" shall be taken to include any form of modulated data signal, carrier wave, and so forth. The term "modulated data signal" means a signal that has one or more of its characteristics set or changed in such a manner as to encode information in the signal.

The terms "machine-readable medium," "computer-readable medium," and "device-readable medium" mean the same thing and may be used interchangeably in this disclosure. The terms are defined to include both machine-storage media and transmission media. Thus, the terms include both storage devices/media and carrier waves/modulated data signals.

The various operations of example methods described herein may be performed, at least partially, by one or more processors that are temporarily configured (e.g., by software) or permanently configured to perform the relevant operations. Similarly, the methods described herein may be at least partially processor-implemented. For example, at least some of the operations of the methods 1000, 1100, and 1200 may be performed by one or more processors. The performance of certain of the operations may be distributed among the one or more processors, not only residing within a single machine, but also deployed across a number of machines. In some example embodiments, the processor or processors may be located in a single location (e.g., within a home environment, an office environment, or a server farm), while in other embodiments the processors may be distributed across a number of locations.

Although the embodiments of the present disclosure have been described with reference to specific example embodiments, it will be evident that various modifications and changes may be made to these embodiments without departing from the broader scope of the inventive subject matter.

Accordingly, the specification and drawings are to be regarded in an illustrative rather than a restrictive sense. The accompanying drawings that form a part hereof show, by way of illustration, and not of limitation, specific embodiments in which the subject matter may be practiced. The embodiments illustrated are described in sufficient detail to enable those skilled in the art to practice the teachings disclosed herein. Other embodiments may be used and derived therefrom, such that structural and logical substitutions and changes may be made without departing from the scope of this disclosure. This Detailed Description, therefore, is not to be taken in a limiting sense, and the scope of various embodiments is defined only by the appended claims, along with the full range of equivalents to which such claims are entitled.

Such embodiments of the inventive subject matter may be referred to herein, individually and/or collectively, by the term "invention" merely for convenience and without intending to voluntarily limit the scope of this application to any single invention or inventive concept if more than one is in fact disclosed. Thus, although specific embodiments have been illustrated and described herein, it should be appreciated that any arrangement calculated to achieve the same purpose may be substituted for the specific embodiments shown. This disclosure is intended to cover any and all adaptations or variations of various embodiments. Combinations of the above embodiments, and other embodiments not specifically described herein, will be apparent, to those of skill in the art, upon reviewing the above description.

In this document, the terms "a" or "an" are used, as is common in patent documents, to include one or more than one, independent of any other instances or usages of "at least one" or "one or more." In this document, the term "or" is used to refer to a nonexclusive or, such that "A or B" includes "A but not B," "B but not A," and "A and B," unless otherwise indicated. In the appended claims, the terms "including" and "in which" are used as the plain-English equivalents of the respective terms "comprising" and "wherein." Also, in the following claims, the terms "including" and "comprising" are open-ended; that is, a system, device, article, or process that includes elements in addition to those listed after such a term in a claim is still deemed to fall within the scope of that claim.

The following numbered examples are embodiments:

1. A method comprising: identifying, on a network site, a database object generated by a first client device of a first end-user of the network site; receiving, from the first client device, a share masking policy for modifying data in the database object, the share masking policy specifying a user role type to initiate one or more preconfigured masking operations on the database object; generating a network link for access to the database object by a second end-user of the network site; receiving, from a second client device of the second end-user, a request to access the database data using the network link; in response to the request from the second client device, determining that an end-user role of the second end-user matches the user role type of the share masking policy; in response to the end-user role matching the user role type of the share masking policy, applying the one or more preconfigured masking operations on the database object to generate a masked database object; and causing, the second client device of the second end-user, a presentation of result data from the masked database object.

2. The method of example 1, wherein the request from the second client device is a query.

3. The method of examples 1 or 2, wherein the query comprises a select statement, and wherein the select statement is applied to the masked database object to generate the result data displayed in the presentation.

4. The method of any one of examples 1-3, wherein the database object is stored in a first database instance managed by the first end-user, wherein the masked database object is hosted on a second database instance managed by the second end-user without copying the database object from the first database instance to the second database instance.

5. The method of any one of examples 1-4, wherein the database object comprises one or more external tables.

6. The method of any one of examples 1-5, wherein the share masking policy is received in structured query language (SQL) format and stored in a share masking database.

7. The method of any one of examples 1-6, wherein the share masking policy is mapped to the database object, the share masking policy comprising a plurality of user role types including the user role type, wherein each of the plurality of user role types is mapped to a function that masks the database object.

8. The method of any one of examples 1-7, wherein the function is a database function that is executable against the database object to cause one or more transformations to one or more columns of the database object.

9. The method of any one of examples 1-8, wherein: the share masking policy is a first share masking policy; and the database object is a database view that is mapped to the share masking policy, the database view incorporating data from a database table that is mapped to a second share masking policy.

10. The method of any one of examples 1-9, wherein the second share masking policy is implemented on the database table to generate masked table data that is incorporated in the database view, wherein the database view that includes the masked table data is further masked according to the share masking policy to generate the masked database object.

11. A system comprising: one or more processors of a machine; and a memory storing instructions that, when executed by the one or more processors, cause the machine to perform operations implementing any one of example methods 1 to 10.

12. A machine-readable storage device embodying instructions that, when executed by a machine, cause the machine to perform operations implementing one of methods 1 to 10.

What is claimed is:

1. A method comprising:
receiving, from a first client device of a first end-user of a network site, a share masking policy for masking data in a database view object that comprises data from one or more external tables that are external to the network site, the share masking policy comprising a user defined function mapped by the first end-user to an end-user role type to initiate a masking operation on the database view object in response to an end-user having the end-user role type requesting access to the database view object through the network site;
wherein the one or more external tables are read-only external tables, and wherein the database view object comprises a join on columns from the read-only external tables and other columns from one or more local tables that are stored on the network site;
receiving a request to access the database view object from a second client device of a second end-user of the network site;
determining that an end-user role of the second end-user matches the end-user role type in the share masking policy;
applying the user defined function on the database view object to generate masked data; and
causing, on the second client device, presentation of the masked data.

2. The method of claim 1, further comprising:
receiving, from the first client device of the first end-user, a database statement that maps the end-user role type to the end-user role of the second end-user, such that data from the database view object is masked upon being requested by the second end-user using the network site.

3. The method of claim 1, wherein the request from the second client device comprises a query.

4. The method of claim 3, wherein the query comprises a select statement, and wherein the select statement is applied to the masked data.

5. The method of claim 1, wherein the database view object is stored in a first database instance managed by the first end-user, wherein the masked data is hosted on a second database instance managed by the second end-user without copying the database view object from the first database instance to the second database instance.

6. The method of claim 1, wherein the share masking policy is received in structured query language (SQL) format and stored in a share masking database.

7. The method of claim 1, wherein the share masking policy is mapped to the database view object.

8. The method of claim 1, wherein the user defined function (UDF) is one of a plurality of database UDFs that are SQL UDFs, wherein the end-user role type is one of a plurality of end-user role types, and wherein the method further comprises:
receiving, from the first client device, the plurality of end-user role types in a SQL format;
receiving, from the first client device, the SQL UDFs to apply to the database view object upon a request to the database view object being received from at least one of the plurality of end-user role types; and
storing the plurality of end-user role types and corresponding SQL UDFs as the share masking policy for modifying data of the database view object.

9. The method of claim 1, wherein:
the share masking policy is a first share masking policy; and
the database view object is the database view object that is mapped to the share masking policy, the database view object incorporating data from a database table that is mapped to a second share masking policy.

10. The method of claim 9, wherein the second share masking policy is implemented on the database table to generate masked table data that is incorporated in the database view object, wherein the database view object that includes the masked table data is further masked according to the share masking policy to generate the masked data that is displayed on the second client device.

11. A system comprising:
one or more processors of a machine; and
a memory storing instructions that, when executed by the one or more processors, cause the machine to perform operations comprising:
receiving, from a first client device of a first end-user of a network site, a share masking policy for masking data in a database view object that comprises data from one or more external tables that are external to the network site, the share masking policy comprising a user defined function mapped by the first end-user to an end-user role type to initiate a masking operation on the database view object in response to an end-user having the end-user role type requesting access to the database view object through the network site;

wherein in the database view object comprises a join on columns from the one or more external tables and other columns from one or more local tables that are stored on the networks site;

receiving a request to access the database view object from a second client device of a second end-user of the network site;

determining that an end-user role of the second end-user matches the end-user role type in the share masking policy;

applying the user defined function on the database view object to generate masked data; and causing, on the second client device, presentation of the masked data.

12. The system of claim 11, the operations further comprising:

receiving, from the first client device of the first end-user, a database statement that maps the end-user role type to the end-user role of the second end-user, such that data from the database view object is masked upon being requested by the second end-user using the network site.

13. The system of claim 11, wherein the request from the second client device comprises a query.

14. The system of claim 13, wherein the query comprises a select statement, and wherein the select statement is applied to the masked data.

15. The system of claim 11, wherein the database view object is stored in a first database instance managed by the first end-user, wherein the masked data is hosted on a second database instance managed by the second end-user without copying the database view object from the first database instance to the second database instance.

16. The system of claim 11, wherein the share masking policy is received in structured query language (SQL) format and stored in a share masking database.

17. The system of claim 11, wherein the share masking policy is mapped to the database view object.

18. The system of claim 11, wherein the user defined function (UDF) is one of a plurality of database UDFs that are SQL UDFs, wherein the end-user role type is one of a plurality of end-user role types, and wherein the operations further comprise:

receiving, from the first client device, the plurality of end-user role types in a SQL format;

receiving, from the first client device, the SQL UDFs to apply to the database view object upon a request to the database view object being received from at least one of the plurality of end-user role types; and storing the plurality of end-user role types and corresponding SQL UDFs as the share masking policy for modifying data of the database view object.

19. The system of claim 11, wherein:

the share masking policy is a first share masking policy; and the database view object is the database view object that is mapped to the share masking policy, the database view object incorporating data from a database table that is mapped to a second share masking policy.

20. The system of claim 19, wherein the second share masking policy is implemented on the database table to generate masked table data that is incorporated in the database view object, wherein the database view object that includes the masked table data is further masked according to the share masking policy to generate the masked data that is displayed on the second client device.

21. A machine-readable storage device embodying instructions that, when executed by a machine, cause the machine to perform operations comprising:

receiving, from a first client device of a first end-user of a network site, a share masking policy for masking data in a database view object that comprises data from one or more external tables that are external to the network site, the share masking policy comprising a user defined function mapped by the first end-user to an end-user role type to initiate a masking operation on the database view object in response to an end-user having the end-user role type requesting access to the database view object through the network site;

wherein the database view object comprises a join on columns from the one or more external tables and other columns from one or more local tables that are stored on the network site:

receiving a request to access the database view object from a second client device of a second end-user of the network site;

determining that an end-user role of the second end-user matches the end-user role type in the share masking policy;

applying the user defined function on the database view object to generate masked data; and causing, on the second client device, presentation of the masked data.

22. The machine-readable storage device of claim 21, the operations further comprising:

receiving, from the first client device of the first end-user, a database statement that maps the end-user role type to the end-user role of the second end-user, such that data from the database view object is masked upon being requested by the second end-user using the network site.

23. The machine-readable storage device of claim 21, wherein the request from the second client device comprises a query.

24. The machine-readable storage device of claim 23, wherein the query comprises a select statement, and wherein the select statement is applied to the masked data.

25. The machine-readable storage device of claim 21, wherein the database view object is stored in a first database instance managed by the first end-user, wherein the masked data is hosted on a second database instance managed by the second end-user without copying the database view object from the first database instance to the second database instance.

26. The machine-readable storage device of claim 21, wherein the share masking policy is received in structured query language (SQL) format and stored in a share masking database.

27. The machine-readable storage device of claim 21, wherein the share masking policy is mapped to the database view object.

* * * * *

UNITED STATES PATENT AND TRADEMARK OFFICE
CERTIFICATE OF CORRECTION

PATENT NO. : 11,574,072 B2
APPLICATION NO. : 17/334315
DATED : February 7, 2023
INVENTOR(S) : Avanes et al.

Page 1 of 1

It is certified that error appears in the above-identified patent and that said Letters Patent is hereby corrected as shown below:

In the Claims

In Column 30, Line 25, in Claim 21, delete "site:" and insert --site;-- therefor Signed and Sealed this
Thirteenth Day of February, 2024

Katherine Kelly Vidal
*Director of the United States Patent and Trademark Office*